(12) United States Patent
Atilano Medina et al.

(10) Patent No.: US 7,525,214 B2
(45) Date of Patent: Apr. 28, 2009

(54) WAVE-POWER SYSTEM AND METHOD FOR GENERATING ENERGY AT CONSTANT ROTATIONAL SPEED AT VARIABLE SIGNIFICANT WAVE HEIGHTS AND PERIODS

(75) Inventors: Alvaro Jose Atilano Medina, Caracas (VE); Rafael Uzcategui Trinkl, Caracas (VE)

(73) Assignee: Nova Oceanic Energy Systems, Miami, FL (US)

( * ) Notice: Subject to any disclaimer, the term of this patent is extended or adjusted under 35 U.S.C. 154(b) by 232 days.

(21) Appl. No.: 11/681,816

(22) Filed: Mar. 5, 2007

(65) Prior Publication Data
US 2008/0197631 A1 Aug. 21, 2008

Related U.S. Application Data

(60) Provisional application No. 60/813,762, filed on Jun. 14, 2006.

(51) Int. Cl.
*F03B 13/12* (2006.01)
(52) U.S. Cl. .............................. 290/53; 290/42; 60/505
(58) Field of Classification Search ............ 290/42, 290/43, 44, 53, 54, 55; 60/497, 502
See application file for complete search history.

(56) References Cited

U.S. PATENT DOCUMENTS

| 3,746,875 | A | * | 7/1973 | Donatelli | 290/42 |
|---|---|---|---|---|---|
| 3,911,287 | A | * | 10/1975 | Neville | 290/53 |
| 3,959,663 | A | * | 5/1976 | Rusby | 290/53 |
| 4,009,395 | A | * | 2/1977 | Long et al. | 290/53 |
| 4,170,738 | A | * | 10/1979 | Smith | 290/42 |
| 4,184,335 | A | * | 1/1980 | Byrne | 60/496 |
| 4,184,336 | A | * | 1/1980 | Lamberti | 60/507 |
| 4,305,003 | A | * | 12/1981 | Basurto et al. | 290/54 |
| 4,319,454 | A | * | 3/1982 | Lucia | 60/506 |
| 4,389,843 | A | * | 6/1983 | Lamberti | 60/507 |
| 4,392,060 | A | * | 7/1983 | Ivy | 290/53 |
| 4,408,455 | A | * | 10/1983 | Montgomery | 60/505 |
| 4,539,484 | A | * | 9/1985 | Suggs | 290/53 |
| 4,599,858 | A | * | 7/1986 | La Stella et al. | 60/497 |
| 5,311,064 | A | * | 5/1994 | Kumbatovic | 290/53 |
| 5,929,531 | A | * | 7/1999 | Lagno | 290/53 |
| 6,389,810 | B1 | * | 5/2002 | Nakomcic | 60/502 |
| 6,574,957 | B2 | * | 6/2003 | Brumfield | 60/398 |
| 6,849,963 | B2 | * | 2/2005 | Grinsted et al. | 290/42 |

\* cited by examiner

*Primary Examiner*—Nicholas Ponomarenko
(74) *Attorney, Agent, or Firm*—Robert Platt Bell

(57) ABSTRACT

A wave energy conversion system or device is provided which includes a hull that serves as a float, moving up and down with incoming waves. The power take-off system contained within the hull comprises a longitudinal main rotary shaft upon which a series different diameter sets of dual same-diameter pinions interact with the main rotary shaft through their corresponding freewheels. This interaction only allows the main rotary shaft to rotate in only one direction. A fork-like rod system member that is either fixed directly to a base on the seabed or to a supporting underwater taut moored floating platform. This fork-like rod system member has an alternate rod in permanent contact with each pinion (two rods per each set of dual same-diameter pinions). The device also is capable of self-adjusting its mechanical properties and orientation to take into account the predominant wave frequency and direction over a period of time in a practical way to provide continuous, or multiple level, tuning of the system and is self-orienting for maximum and minimum energy absorption depending on sea conditions.

30 Claims, 36 Drawing Sheets

WAVE-POWER SYSTEM AND METHOD FOR GENERATING ENERGY AT CONSTANT ROTATIONAL SPEED AT VARIABLE SIGNIFICANT WAVE HEIGHTS AND PERIODS

CROSS-REFERENCE TO RELATED APPLICATIONS

The present application claims priority from Provisional U.S. Patent Application Ser. No. 60/813,762, filed on Jun. 14, 2006, and incorporated herein by reference.

FIELD OF THE INVENTION

The present invention relates to heaving-buoy wave-energy converters. In particular, the present invention is directed toward a multiple double-action power take-off system utilizing a large range of significant wave heights and wave periods. The invention is a converter that changes random movement of waves into high-speed rotational movement. Also, the invention describes a method for maintaining a constant rotational speed of flywheels and therefore constant electric generating power or any other use of flywheel power may be made (rotary pumps, desalinization, and other equivalent devices that utilize rotary motion to function) at a large range of significant wave heights and wave periods.

BACKGROUND OF THE INVENTION

There are several reasons that have made wave energy converters more attractive since the beginning of the present decade. First, there are global warming issues—carbon dioxide emissions must be reduced in many industrialized countries due to ratification of the Kyoto Convention. Also, recent hurricane seasons have created growing concerns among some industrialized countries about climate change. Cuts in greenhouse gas emissions may ultimately be needed to stabilize atmospheric concentrations of the gases and avert serious climate disruptions. This reduction in greenhouse gases may require a global transition to renewable low carbon energy sources and improvements in energy efficiency.

Secondly, a dwindling supply of peak oil reserves and growing demand of oil by large nations such as China and India, in addition to growing political tensions in oil producing countries, have increased oil prices tremendously. In the *Annual Energy Outlook* 2006 (AEO2006) report, prepared by the U.S. Energy Information Administration (EIA) and incorporated herein by reference, it is estimated that, as new oil fields are brought into production worldwide, world oil prices may decline to $46.90 per barrel (2004 dollars) in 2014, and then rise to $56.97 in 2030. This means that during the expected period of maturity of wave technology (2006-2015) and consolidation of its market (up to 2025), the price of oil is projected to be near or above US$ 50 per barrel. This scenario makes the development of alternative energy technology very viable.

Others issues such as declining coal use, increased opposition to hydroelectric dams, increasing demand for renewable energy sources, and deregulation of energy markets may contribute to the development of alternative energy technology, and in particular, ocean and wave energy converters.

Even though wave energy technology development has been going on for a long time, there are major challenges that must be surpassed before this type of technology may be widely used. Among these challenges are:

Lowering capital costs
Maintenance requirements;
Generating power based on a diffuse and variable resource; and
Power quality
Survivability in a harsh environment.

The motion of ocean waves has long been considered a major potential resource of both potential and kinetic energy. At the same time, wave energy performance measures are characterized by diffuse energy, enormous forces during storms, and variation over wide range in wave size, length, period, and direction. Techniques for changing the random forces generated by waves into useful energy in an apparatus may be through one or more of the following power take-off systems, including pneumatic systems, hydraulic systems, piezoelectric systems, electrical systems, and mechanical systems.

The background (prior) art for the present invention in principally found in US Patent Class 60, sub-classes 495-507, Class 290/42-44, 52-54, 60, Class 417/330-334, International Patent Class F03B13/00-18. Of particular interest are the following prior art patent applications and patents, all of which are incorporated herein by reference: US2006/0028026; U.S. Ser. No. 884080; U.S. Pat. Nos. 3,894,241; 4,524,283; 6,933,624; 6,925,800; 6,857,266; 6,711,897; 6,269,636; 6,208,035; 5,359,229; 5,105,094; 4,661,716; 4,599,858; 4,319,454; DE4129180; CA2464184; CN1506574; DE20312348U; GB2037899; GB2008686; GB1515744; GB2064665; GB190908116; NL1016103C; U.S. Pat. Nos. 1,346,399; 3,259,361; 4,241,579; 3,974,652; 5,359,229; 4,389,843; WO0075506; WO 2005 038244; WO 00017519; WO 00065708; WO 03098033; WO 04094814, WO8100284A1, JP07229470A2, JP2005299556A2, JP58062380A2, JP58079675A2, U.S. Pat. Nos. 4,249,639, 3,567,953, 6,644,027, 5,929,531, 4,392,060, 4,627,240, 3,959,663, 3,777,494, US20050237775A1, and U.S. Pat. No. 4,108,578.

The majority of the technologies described in the aforementioned references present one or many of the following problems. Some Prior Art designs have many moving parts that may fail in the long run, requiring frequent maintenance and repair. Other embodiments would not survive harsh weather or high waves of the maritime environment. Many of prior art devices have open power take-off (PTO) systems where the PTO system is not contained in an enclosed structure and thus open to the elements and the harsh salt-water environment.

Still other systems have very high capital costs due to the construction in open sea of fixed seabed structures. Other systems have high maintenance costs due to use of ropes and/or pulleys and/or chains and/or springs that may fail in the long run. In addition, the power quality is low due to the lack of a control system to maintain power quality in a variable resource or the inability to accommodate the variety of wave heights and periods, which occur on an hourly and daily and seasonal basis. These Prior Art systems have no self-oriented capability to position themselves to absorb the maximum amount of energy from waves and thus optimize energy production, or to position to absorb the minimum amount of energy from waves during storm sea conditions.

In addition, the lack of control systems in the Prior Art limits the ability to vary power generation amount with the size of waves. Power output is limited to the installed capacity of a generator and its operational limits. Many systems use only one generator per power take-off (PTO) system. Once the generator fails the conversion of energy stops, and the entire system is "down" until a service crew may be dispatched. Conversion is limited to one generator and therefore to its operational limits.

In devices where the power take-off (PTO) system is enclosed in a hull-like structure, there is not a positive pressure control inside the tide hull (hermetic hulls) to prevent entry of seawater. Since all of the floating offshore devices have PTO systems that interact with waves, they are exposed to infiltration through the areas where the actuating member meets the frame (or hull) underwater for long periods of times. Since one of the major purposes of design is to lower maintenance costs (months or years unattended in offshore location), control of leakage/infiltration is important.

In the case of electric power generation, some of the aforementioned Prior Art references confront the power quality in a variable resource (waves of variable significant wave height and wave periods) by maintaining constant speed of the main shaft through mechanical brakes and or increasing the load of the generators (electromagnetic braking); however all of those systems have limitations in the large range of waves of variable significant wave height and wave periods. Some others maintain constant speed of the generators by controlling hydraulic or airflow to the power take-off system.

In the International Patent Application WO8100284A1, incorporated herein by reference, it is mentioned in page 2, lines 12 to 16 "In the invention disclosed and described herein, each rack and pinion drive assembly mounted along the rotatable shaft provides a completely independent power stroke to the drive shaft regardless of what any of the other drive assemblies are doing . . . " This means that all drive assemblies, or one, or any number of them can be transmitting power (engaged) to the drive shaft at any time. In our invention only one set of dual same diameter pinions can be engaged to the main rotary shaft at any time. Related to the completely independent power stroke by each rack and pinion drive assembly as mentioned above, WO8100284A1 mentions in page 8, lines 25 to 32: "One driving assembly 14 may be moved upwardly a short distance by a low wave while another may continue upward for a longer distance by a higher wave, and yet both will continue to apply driving force to rotary shaft 2 in the same direction of rotation without one driving assembly 14 working against or opposing another. The same is true on the downward stroke." This is highly unlikely to occur in seas, lakes or ocean where waves rise and fall in random, unpredictable fashion. It would only occur if the upwardly (or downwardly) velocity of the float hit by the low wave is exactly the same upwardly (or downwardly) velocity of the float hit by the higher wave. It is highly more probable that the upwardly (or downwardly) velocity of the float hit by the higher wave will be greater than the upwardly (or downwardly) velocity of the float hit by the low wave. This would make the rotational speed transmitted to the drive shaft by the float hit by the higher wave greater than that transmitted by the float hit by the low wave, rendering the energy generated by the float hit by the low wave useless (i.e., this energy would not be transmitted to the drive shaft). This situation is avoided in our invention since all energy generated by the float at any time is transmitted to the main rotary shaft through a single set of dual same diameter pinions. The invention described in WO8100284A1 has a float attached to each independent rack and pinion drive assembly. Since the energy that is transmitted to the drive shaft is ultimately generated from the floats in contact with the waves, at a given wave high, the maximum amount of energy of this device will be generated if all float have the same upwardly (or downwardly) velocity at the same time. As mentioned above, this is highly unlikely. Therefore, it is probable that the energy generated by this device will be always lower than that possibly generated by its total floating capacity. In our invention, since there is only one float (large by design since all the power take off system including flywheels and generators are within it) all the floating capacity of our invention is used to generate energy at any time. The invention described in WO8100284A1 does not have a self-orienting capability. So, except in those locations where the waves will always come from the same direction, the device sometimes would be hit by waves in a perpendicular manner making floats to raise one after the other (and therefore lowering its energy absorption capacity), and sometimes would be hit by waves in a parallel manner making floats to raise all together. Sometimes it will be hit by waves in an angle. Our invention has a self-orienting capability. All the time when waves are within design parameters of the power take off system, our invention will orient itself in a parallel manner to the waves for maximum energy extraction per wave crest. When these design parameters are being surpassed, it will orient itself in a perpendicular manner to the waves for minimum energy extraction per wave crest. The invention described in WO8100284A1 does not have a submerging capability to deal with storm conditions. Ours does.

In the background of the International Patent Application WO2005069824, incorporated herein by reference, it is mentioned that in order to increase the efficiency of converting wave energy to electric energy using wave energy converters (WECs), "It has also been proposed to adjust the mechanical properties of the WEC to take into account the predominant wave frequency over a period of time. Incorporating such a proposal requires mechanical devices that change the spring, mass and damping of the WEC. However, to effectuate the called for proposed adjustments to the mechanical properties of a WEC is problematic since there is no practical way to provide continuous, or multiple level, tuning of the system". In the same International Patent Application it is mentioned, "In all of known proposed wave energy converter efficiency-boosting schemes, the energy storage and/or tuning components are large and/or expensive making it difficult and/or expensive to produce commercially viable products."

The aforementioned problems or challenges are precisely those which the present invention is oriented to solve.

SUMMARY OF THE INVENTION

It is an objective of the present invention to convert the mechanical energy contained in the slow and random movement of waves into a more useful form of constant high speed rotation at a large range of different wave heights and periods.

It is another principal objective of the present invention to self-adjust the mechanical properties of the wave energy converter (WEC) to take into account the predominant wave frequency over a period of time in a practical way to provide continuous, or multiple level, tuning of the system, and to achieve this inexpensively to allow building commercially viable products.

It is another objective of the present invention to vary power generation quantity with the size and periods of waves, delivering more power as wave heights increase or wave periods decrease or a combination of both of these factors.

It is another objective of the present invention, in the case of electric power generation, to generate the same power quality in a variable resource. It may maintain the same given frequency and/or rotational constant speed at a large range of different wave heights or periods.

It is another objective of the present invention, in the case of any other use of flywheel power that may be made (rotary pumps, desalinization, and other equivalent devices that utilize rotary motion to function), to generate maximum power in a variable resource. It may maintain the maximum frequency and/or rotational speed that may be obtained at a large range of different wave heights or periods.

It is another objective of the present invention to absorb the maximum amount of energy per wave crest in normal sea conditions.

It is another objective of the present invention to absorb the minimum amount of energy per wave crest in abnormal or stormy sea conditions when the design parameters of the device are being surpassed.

It is another objective of the present invention to provide a device that may survive harsh weather or high waves.

In order to accomplish these objectives there is provided a wave energy conversion system or device comprised of a strong main frame or hull that contains an innovative power take-off system totally isolated from the sea environment. This frame or hull is the structure that serves as a float, moving up and down when interacting with incoming waves. The innovative power take-off system contained within the water-tied floating frame or hull comprises a longitudinal main rotary shaft upon which a series different diameter sets of dual same-diameter pinions interact with the main rotary shaft through corresponding freewheels. This interaction allows the main rotary shaft to rotate in only one direction. A fork-like rod system member is either fixed directly to a base on the seabed or to a supporting underwater taut-moored floating platform. This fork-like rod system member has an alternate rod in permanent contact with each pinion (two rods per each set of dual same-diameter pinions).

The disposition of the rods is such that for each set of dual same-diameter pinions, when the rods are moving up or down in relation to the main rotary shaft (that is to say, when the floating hull is moving down or up), one pinion is moving clockwise and the other pinion is moving counterclockwise. Since the pinions interact with the main rotary shaft through their corresponding freewheels, only one pinion of a set may transmit the energy of the wave through its rod to the main shaft at any given time. The transmission of energy from the fork-like rod system member to the main rotary shaft through a set of dual same-diameter pinions can only occur if such a set of dual pinions is engaged.

This engagement of a set of dual same-diameter pinions may be through an electromagnetic clutch or through a mechanical engagement system or an equivalent mechanism. Only one set of dual same-diameter pinions may be engaged at any given time. In the case of electric power generation, the set that may be engaged is the one that, at the given wave height and period of the time, has pinions with the required diameter to maintain a given constant rotational speed of the main shaft. This constant rotational speed of the main shaft would depend of the frequency for electric generation required by the grid system where the device may be connected. In the case of any other use of flywheel power that may be made (rotary pumps, desalinization, and other equivalent devices that utilize rotary motion to function), the set that may be engaged is the one that, at the given wave height and period of the time, has pinions with the required diameter to maintain the highest required rotational speed of the main shaft.

Control System A decides which set of dual same-diameter pinions to engage based on a rotational speed sensor on the main shaft or on its flywheels. This system may comprise a programmable logic controller (PCL) mechanism or the like. The main rotary shaft may be provided with a number of flywheels, which may serve to storage energy and deliver power in a smooth way to a series of generators (or any other equivalent devices which utilize rotary motion to function) engaged to them.

In the case of electric power generation, there may be one, two or a number of generators to which the flywheels may transmit their power once engaged. These generators may be of the same or different capacity each depending on a given set of design characteristics of the WEC. The number of generators may be proportional to the number of different diameter sets of dual same-diameter pinions along the main rotary shaft. For each set of dual same-diameter pinions there may be one or more generators that may be engaged to absorb flywheel power depending on a given set of design characteristics of the WEC.

The engagement of the generators to the flywheels may depend on changes in wave heights and periods. In general, in the case of electric power generation, the principle of operation in normal sea conditions may be that, to maintain constant rotational speed of the main shaft, the larger the incoming wave is, the larger the diameter of a set of dual same-diameter pinions has to be chosen and engaged, and therefore the larger may be the energy output transmitted to the flywheels. The engagement of the larger diameter set of dual same-diameter pinions is simultaneous as the disengagement of the smaller diameter set of dual same-diameter pinions. As the engagement of a set of dual same-diameter pinions goes from a smaller diameter set to a larger diameter set, the corresponding number of generators of this larger diameter set of dual same-diameter pinions may be additionally engaged to the flywheels. This engagement of additional generators may be simultaneous or sequential with the engagement of the larger diameter set of dual same-diameter pinions. In the case of sequential engagement, either one or more of the generators corresponding to the larger diameter set of dual same-diameter pinions are engaged first and then the set of pinions is engaged or vice versa.

The opposite may occur when normal sea conditions change from a larger wave height to smaller wave heights. To maintain constant rotational speed of the main shaft, the smaller the incoming wave is, the smaller the diameter of the set of dual same-diameter pinions has to be chosen and engaged, and therefore the smaller may be the energy output transmitted to the flywheels. The engagement of the smaller diameter set of dual same-diameter pinions is simultaneous as the disengagement of the larger diameter set of dual same-diameter pinions. As the engagement of a set of dual same-diameter pinions goes from a larger diameter set to a smaller diameter set, the corresponding number of generators of the larger diameter set of dual same-diameter pinions may be disengaged from the flywheels and the power output of the WEC is reduced. This disengagement of generators may be simultaneous or sequential with the disengagement of the larger diameter set of dual same-diameter pinions. In the case of sequential disengagement, either one or more of the generators corresponding to the larger diameter set of dual same-diameter pinions are disengaged first and then the set of pinions is disengaged or vice versa.

In the case of variations of wave periods for a given wave height, the principle of operation may be that, to maintain constant rotational speed of the main shaft, the shorter the incoming wave period is, the larger the diameter of a set of dual same-diameter pinions has to be chosen, and therefore the larger may be the energy output transmitted to the flywheels. The engagement of the larger diameter set of dual same-diameter pinions is simultaneous as the disengagement of the smaller diameter set of dual same-diameter pinions. As the engagement of a set of dual same-diameter pinions goes from a smaller diameter set to a larger diameter set, the corresponding number of generators of this larger diameter set of dual same-diameter pinions may be additionally engaged to the flywheels. This engagement of additional generators may be simultaneous or sequential with the engagement of the larger diameter set of dual same-diameter pinions as explained before.

The opposite may occur when, for a given wave height, sea conditions change from shorter wave periods to longer wave periods. To maintain constant rotational speed of the main shaft, the longer the period of the incoming wave is, the smaller the diameter of the set of dual same-diameter pinions has to be chosen and engaged, and therefore the smaller may be the energy output transmitted to the flywheels. The engagement of the smaller diameter set of dual same-diameter pinions is simultaneous as the disengagement of the larger diameter set of dual same-diameter pinions. As the engagement of a set of dual same-diameter pinions goes from a larger diameter set to a smaller diameter set, the corresponding number of generators of the larger diameter set of dual same-diameter pinions may be disengaged from the flywheels and the power output of the WEC is reduced. This disengagement of generators may be simultaneous or sequential with the disengagement of the larger diameter set of dual same-diameter pinions as explained before.

A more general explanation of how the power take-off system may operate when flywheel power is to be used for electric power generation is as follows. A speed sensor that is a component of Control System A is located to measure rotational speed of the main rotary shaft or its flywheels. For electric power generation, the rotational speed of the main shaft may be constant at a given revolutions per minute (rpm). This constant rotational speed of the main shaft may depend on the frequency of electric generation required by the grid system or machinery where the device may be connected (e.g., 50 or 60 Hz or any other suitable frequency). The speed sensor may measure any change in the rotational speed of the shaft above or below the given constant speed due to changing sea conditions. This information may be communicated to Control System A.

In case of an increase in rotational speed above the given constant speed of the main shaft, Control System A may engage one or more additional generators and/or engage the next larger diameter set of dual same-diameter pinions (at the same time that it disengages the set of dual same-diameter pinions engaged at the time) or both until the rotational speed of the main rotary shaft approaches and/or becomes the given constant revolutions per minute (rpm) that provides the frequency for electric generation required by the grid system or machinery where the device may be connected.

In case of a decrease in rotational speed of the main shaft in relation to the given constant speed of the main shaft, Control System A may disengage one or more generators and/or engage the next smaller diameter set of dual same-diameter pinions (at the same time that it disengages the set of dual same-diameter pinions engaged at the time) or both until the rotational speed of the main shaft approaches and/or becomes the constant given revolutions per minute (rpm) providing the frequency for electric generation required by the grid system or machinery where the device may be connected.

In the case of any other means of use of flywheel power that may be made (e.g., rotary pumps, desalinization, and other equivalent devices that utilize rotary motion to function), the operational behavior of the power take-off system may be varied to accommodate the requirements of the device in question. For example, in the case of using flywheel power for water pumping or desalinization, the principle of operation may be to achieve the maximum rotational speed of the main shaft, and Control System A may be suitably reprogrammed to achieve such a function.

In order to maintain the floating frame or hull oriented in a manner to absorb the greatest amount of energy per wave crest, the frame or hull may have a system of fins or equivalent mechanism, which interact with incoming waves and maintain a desired orientation. During normal sea conditions, and until the rotational speed of the main shaft does not surpass a desired set speed while the set of dual same-diameter pinions of the greatest diameter is engaged and all generators are engaged (or a set of dual same-diameter pinions chosen by design), Control System A may position the fins in a manner to maintain the longitudinal axis of the hull or frame parallel to incoming waves, thus allowing the WEC to absorb the maximum amount of energy per wave crest.

During abnormal sea conditions while the set of dual same-diameter pinions of the greatest diameter is engaged and all generators are engaged (or a set of dual same-diameter pinions chosen by design), and when the rotational speed of the main shaft surpasses a desired set speed, the design capacity of the wave energy converter is being surpassed and Control System A may position the fins in a manner to maintain the longitudinal axis of the hull or frame perpendicular to incoming waves, thus allowing the WEC to absorb the minimum amount of energy per wave crest.

While the fins are in position to absorb the minimum amount of energy per wave crest, the operation of the power take-off system is similar to that described earlier where Control System A may take actions of engaging or disengaging different diameter set of dual same-diameter pinions and corresponding generators according to changes in rotational speed of the main shaft. The action of engaging the next smaller diameter set of dual same-diameter pinions (at the same time that it disengages the set of dual same-diameter pinions engaged at the time) may be taken until a set of dual same-diameter pinions is engaged that by design condition of the WEC and the characteristics of the location of the apparatus may indicate the sea conditions are normal.

At this point in time, Control System A may position the fins in a manner to maintain the longitudinal axis of the hull or frame parallel to incoming waves, thus allowing the WEC to absorb the maximum amount of energy per wave crest. From this point in time, the operation of the power take-off system is similar to that described earlier where Control System A may take actions of engaging or disengaging different diameter set of dual same-diameter pinions and corresponding generators according to changes in the rotational speed of the main shaft.

In the case that even with fins positioned in a manner to absorb the minimum amount of energy per wave crest, and the rotational speed of the main shaft surpasses a desired set speed while the set of dual same-diameter pinions of the greatest diameter is engaged and all generators are engaged (or a set of dual same-diameter pinions chosen by design) (i.e., the design capacity of the wave energy converter is being surpassed), Control System A may fill ballast tanks to lower (submerge) the hull for protection of the entire system.

While the ballast tanks are in the filled status and the fins are in the position to absorb the minimum amount of energy per wave crest, the operation of the power take-off system is similar to that described earlier where Control System A may take actions of engaging or disengaging different diameter set of dual same-diameter pinions and corresponding generators according to changes in the rotational speed of the main shaft. The action of engaging the next smaller diameter set of dual same-diameter pinions (at the same time that it disengages the set of dual same-diameter pinions engaged at the time) may be taken until a set of dual same-diameter pinions is engaged that by design condition of the WEC and the characteristics of the location of the apparatus may indicate the sea conditions are normal.

At this point in time, Control System A may take the actions of emptying the ballast tanks and positioning the fins in a manner to maintain the longitudinal axis of the hull or frame parallel to incoming waves, thus allowing the WEC to absorb the maximum amount of energy per wave crest. The action of emptying the ballast tanks may be taken first, and the positioning the fins in a manner to maintain the longitudinal axis of the hull or frame parallel to incoming waves. From this point in time, the operation of the power take-off system is similar to that described earlier where Control System A may take actions of engaging or disengaging different diameter set of dual same-diameter pinions and corresponding generators according to changes in the rotational speed of the main shaft.

Another control system, Control System B, may be employed to maintain the average distance that the sets of dual same-diameter pinions run on the rods of the fork-like rod system centered on the center of the rods. Control System B may be composed of a sensor placed on a chosen set of dual same-diameter pinions and a programmable logic controller (PCL) mechanism. This system may be programmed in a manner that it may measure the distance run by a pinion up and down from the center of the rod. If, after a given number of waves (to be defined), the average distance run by the pinion up from the center of the rod is larger than the average distance run by the pinion down from the center of the rod, Control System B may raise the fork-like rod system a given distance from its fixed seabed point or from its fixed point to a supporting underwater taut moored floating platform to maintain the difference between the average distance run by the pinion up from the center of the rod and the average distance run by the pinion down from the center of the rod within a set value to be defined.

In the same way if, after a given number of waves (to be defined), the average distance run by the pinion up from the center of the rod is smaller than the average distance run by the pinion down from the center of the rod, Control System B may lower the fork-like rod system a given distance from its fixed seabed point or from its fixed point to a supporting underwater taut-moored floating platform to maintain the difference between the average distance run by the pinion up from the center of the rod and the average distance run by the pinion down from the center of the rod within a set value to be defined. The mechanism for rising or lowering the fork-like rod system may be mechanic, hydraulic, and/or an equivalent mechanism.

Note that while Control System A and Control System B are described herein as two separate control systems, they may comprise different subroutines or control features of a common control system, computer, programmable logic array, neural network, or the like. Other control systems described herein may be similarly combined or grouped into a common controller or controllers without departing from the spirit and scope of the present invention. Similarly, control functions may also be distributed amongst several different systems for improved reliability and redundant systems may be provided to reduce the need for immediate maintenance when a system fails or requires maintenance.

Two additional mechanisms with their respective control systems are conceived. One system is to maintain the pressure inside the hull positive with respect the outside pressure of the hull at all times, to prevent or slow down infiltration of water inside the hull. The other system is to pump out the hull bilge water in case that there is infiltration of water.

The invention is conceived primarily for offshore and near-shore locations. However, the power take-off system may be used in onshore locations if location conditions allow. As mentioned some paragraphs above, the fork-like rod system of the WEC may be fix directly to a base on the seabed. Locations with predominant small wave heights may allow for designing a frame or hull without ballast tanks.

Dimensions of the device, including the number of different diameter sets of dual same-diameter pinions along the main rotary shaft, may be varied to suit prevalent sea conditions of the locality where deployed.

The mechanical-type power take-off system is a rotary turbine like system totally enclosed in a steel (or any other suitable material) hull with no external moving parts except fins. The construction of the device is similar to the construction of buoys and small ships and device is thus very robust.

While the projected conversion efficiencies of WECs under certain circumstances (e.g., design wave height) are greater than those for wind, solar, and others, the output of such devices is significantly less under off-design conditions (small or larger than design waves). The present invention does not have a fixed "design wave height" or "design wave period" but actually has a "design wave height range" and a "design wave period range". So, it is designed to have similar conversion efficiencies for any wave height and/or period within the design ranges. The apparatus self-adapts to provide similar conversion efficiencies for small wave heights to large wave heights and any wave height in between. Also, the apparatus self-adapts to provide similar conversion efficiencies for short wave periods and for long wave periods.

DETAILED DESCRIPTION OF THE INVENTION

The following Figures are not to scale. The actual dimension and/or shape of each of the device components may vary. Only important details of the device are shown, however one of ordinary skill in the art can appreciate how the overall device may be constructed, without undue experimentation. The device may be constructed using standard ship building methods and materials or any appropriate materials and methods to allow efficiency and survivability.

Figure 1:
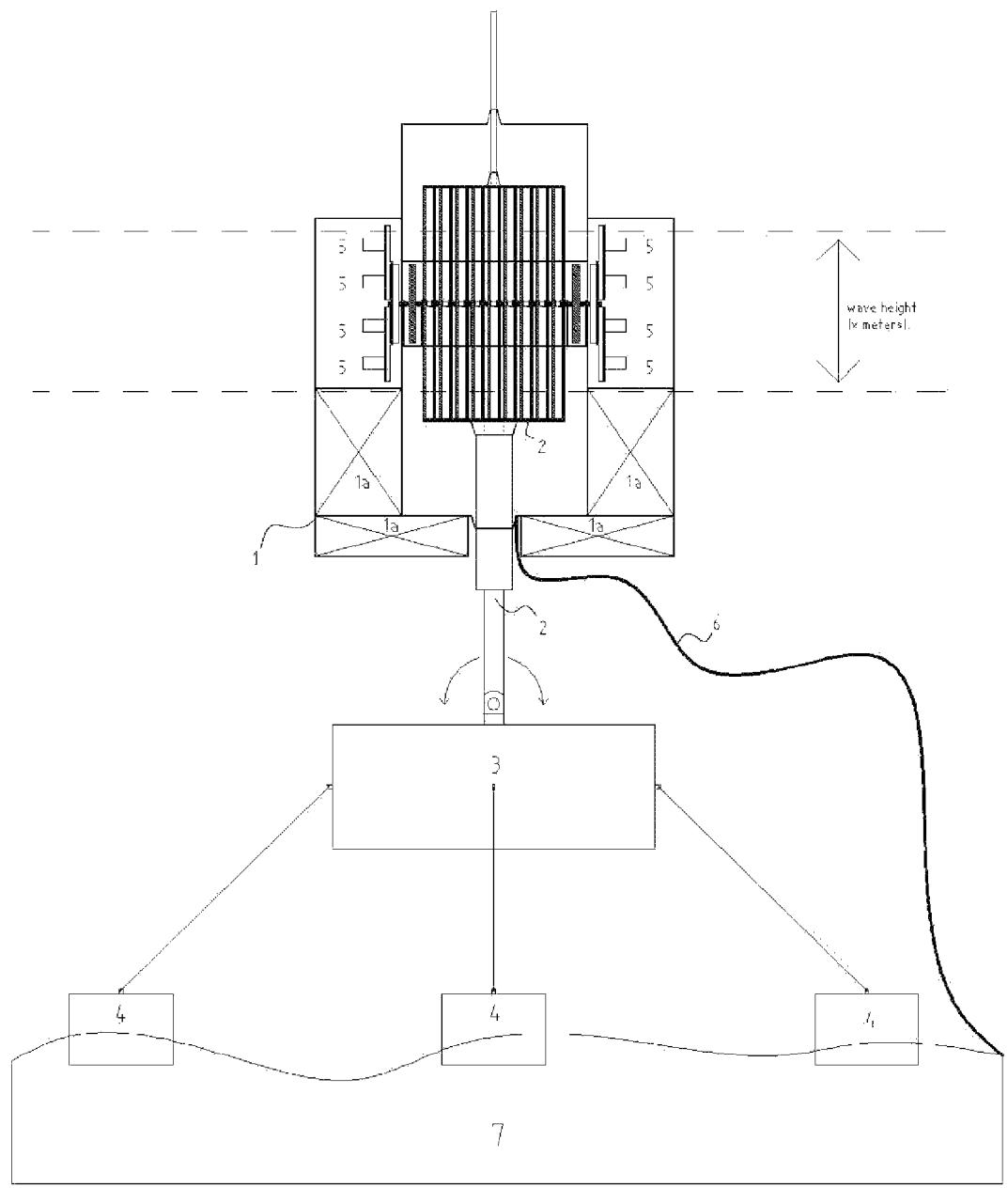
FIG. 1 is a general front view of the wave energy converter of the present invention.
Figure 2:
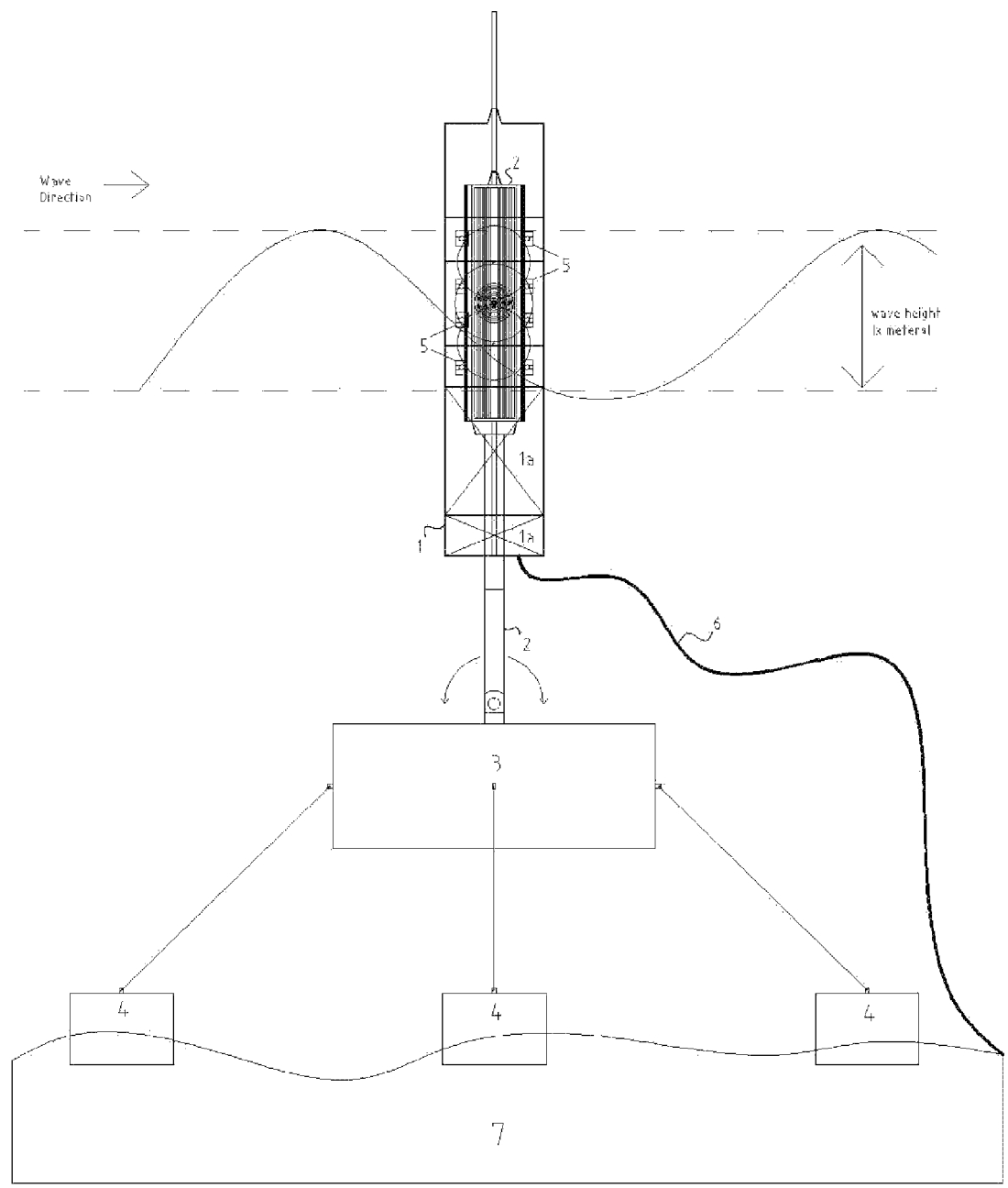
FIG. 2 is a general side view of the wave energy converter of the present invention.

FIG. 1 is a general front view of the wave energy converter. FIG. 2 is a general side view of the wave energy converter of FIG. 1. Note the movement and direction of the waves as illustrated in FIG. 2. Referring to FIGS. 1 and 2, the apparatus is composed of a water-tight hull structure 1 which acts as a floating portion of the device and moves up and down with passing waves. Hull structure 1 has ballast tanks 1a in the lower part. A fork-like rod system 2 acts as the fixed member of the device, not moving up and down with passing waves, but may move sideways a distance in any direction which may depend on the size of the apparatus and the depth of the water at the chosen location. Fork-like rod system 2 is attached to an underwater floating base 3 or directly to a base on seabed 7 (See, e.g., FIG. 25). Floating underwater base 3 may be moored to seabed 7 with weights 4.

Within hull structure 1 acting with fork-like rod system 2 is a power take-off (PTO) system which converts the up and down random movement of waves to high speed rotational movement that may end up, in the case of electric power generation, moving a series of generators 5. This PTO system is explained in more detail later. Power generated by the device may be carried to shore by cable 6.

Figure 3:
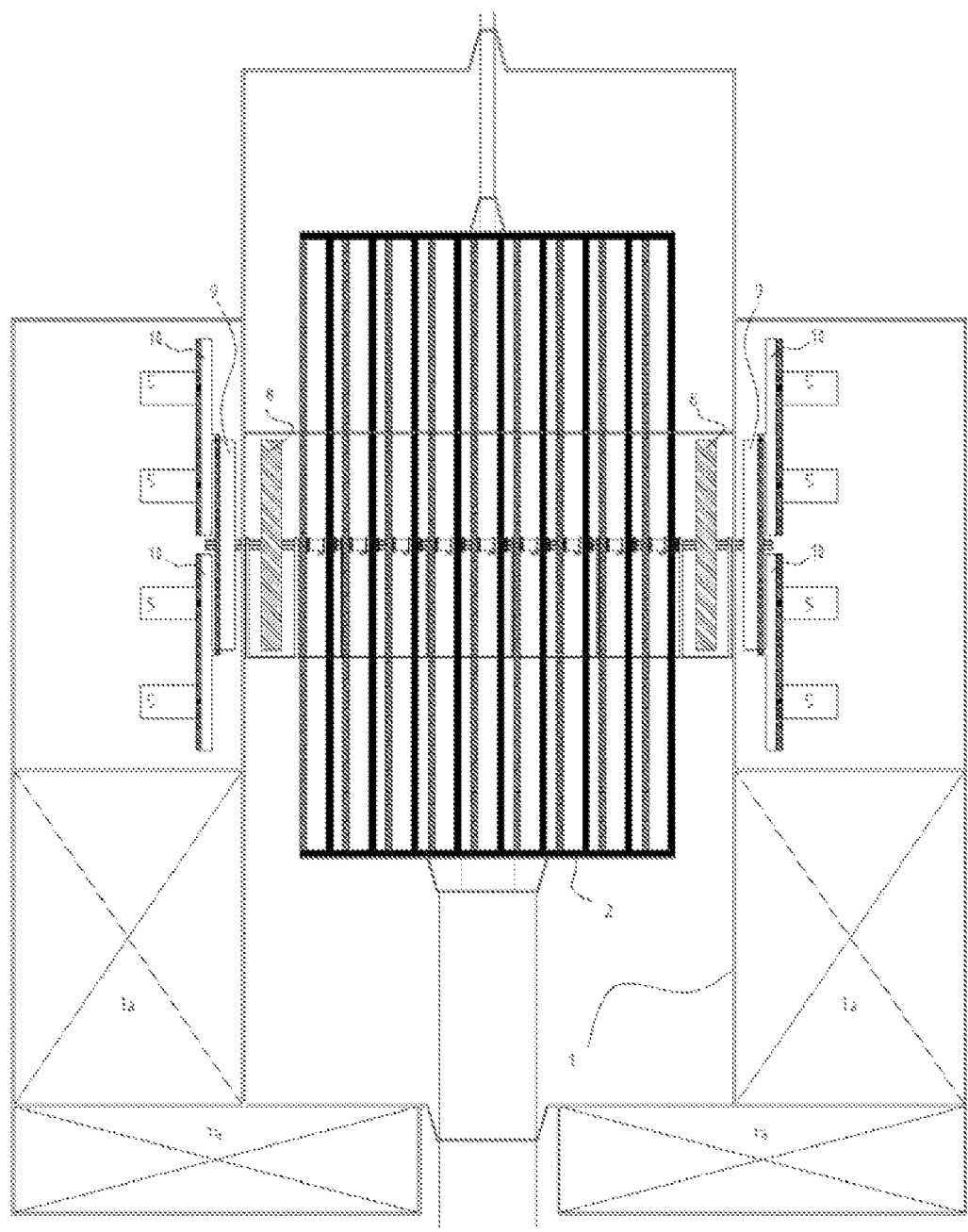
FIG. 3 is an enlarged front view of the wave energy converter of the present invention.

FIG. 3 is an enlarged front view of the wave energy converter of FIGS. 1 and 2. Here again, water-tight hull structure 1 with ballast tanks 1a are shown. Within fork-like rod system 2 is the power take-off (PTO) system that converts the up and down random movement of waves to constant high speed rotational movement storing the resulting energy a series of flywheels 8 and 9. Flywheel power may be used to move electric generators 5 through a series of large pinions 10. Flywheel power may be used to move any other device (rotary pumps, desalinization, and others equivalent devices that utilize rotary motion to function) at a large range of significant wave heights and wave periods.

Figure 4:
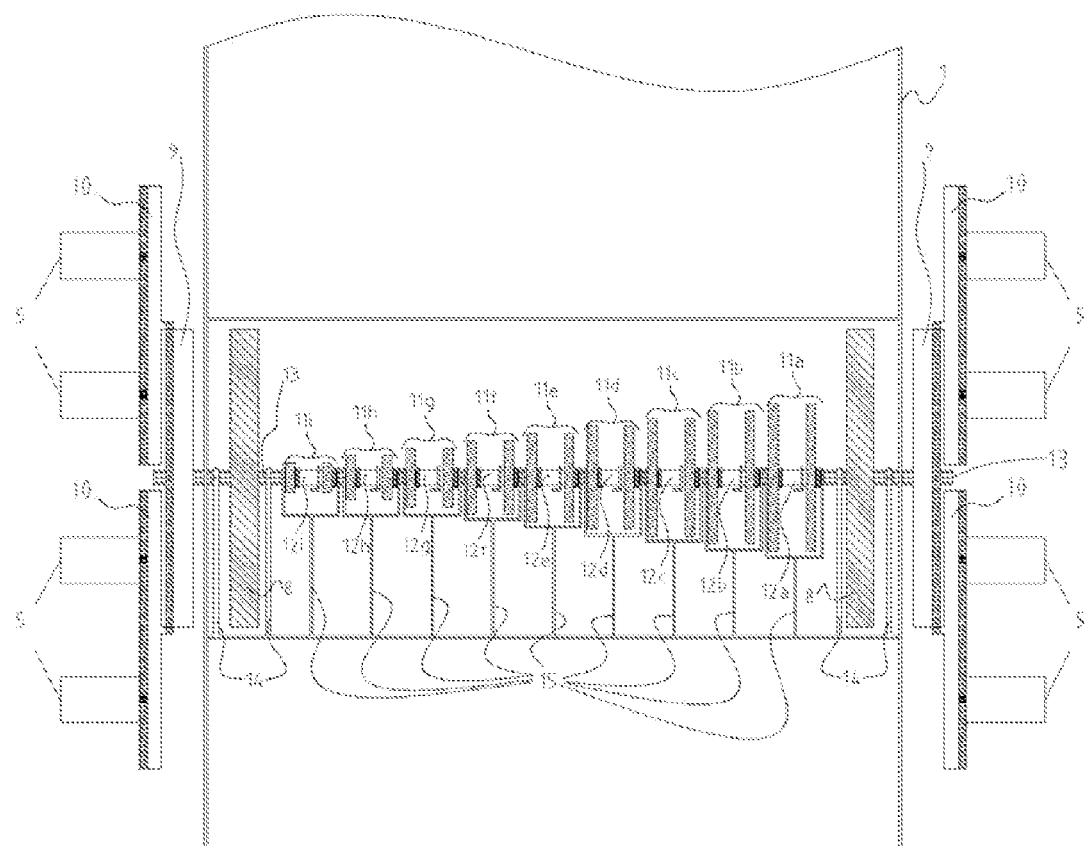
FIG. 4 is a detailed front view of power take-off system without fork-like rod system actuating member.

FIG. 4 is a detailed front view of the power take-off (PTO) system without fork-like rod system actuating member 2 shown, for the sake of illustration. In this sample embodiment of the present invention, a series of nine sets of different diameter of dual same-diameter pinions 11a to 11i and corresponding freewheels (not shown) interact with main rotary shaft 13 through a series of engagement mechanisms 12a to 12i that, depending of the wave height and/or period, engage a particular set of dual same-diameter pinions 11a to 11i through the pinion freewheels. The number of sets of different diameter of dual same-diameter pinions 11a to 11i and corresponding engagement mechanisms may depend on the size of the device and the sea conditions where the device may be located. The engagement of a dual same-diameter pinions set 11a to 11i and corresponding freewheels forces the main rotary shaft to rotate always in the same direction, passing and storing this rotational energy in internal flywheels 8 and external flywheels 9. Flywheels 8 and 9, main rotary shaft 13 and each set of dual same-diameter pinions 11a to 11i and corresponding freewheels are fixed in position to the inside of the hull through supporting bases 14 and 15.

Figure 5:
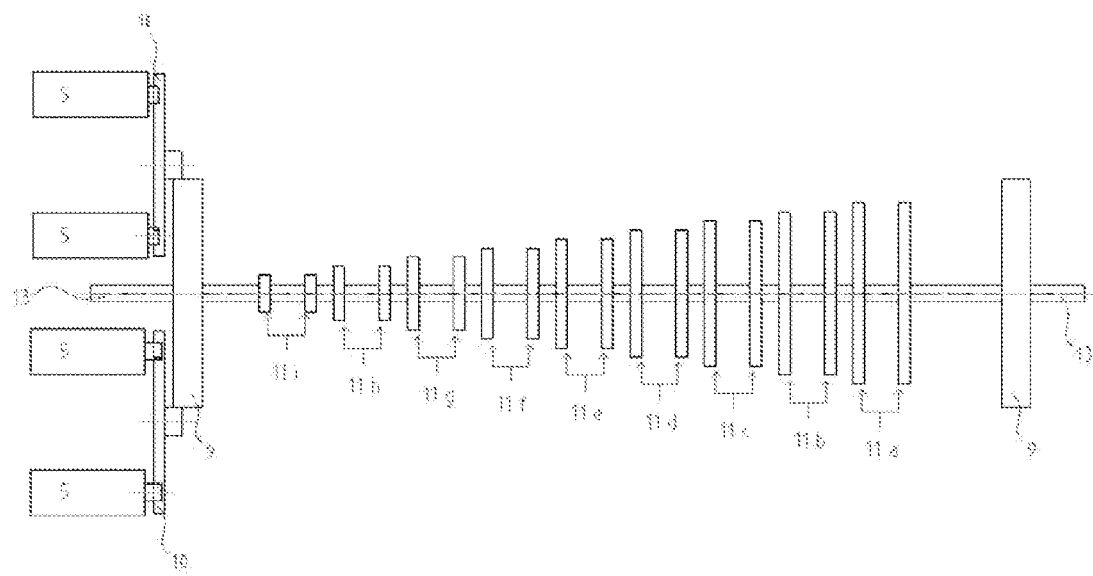
FIG. 5 is a front view of main rotary shaft with several sets of different diameter of dual same-diameter pinions, with set of external flywheels, and a set of flywheel-to-generator power transmission pinions and generators.
Figure 6:
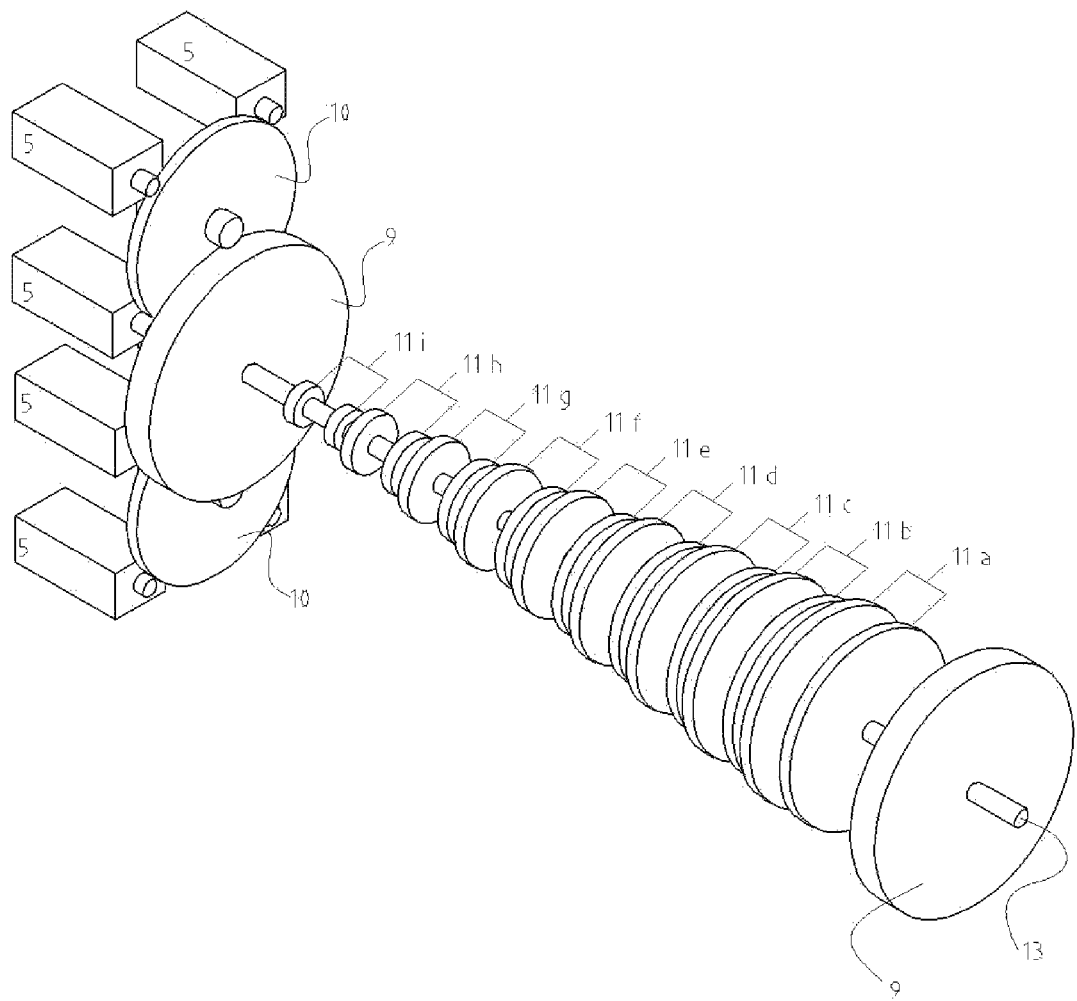
FIG. 6 is a side perspective view of main rotary shaft with several sets of different diameter of dual same-diameter pinions with set of external flywheels, and a set of flywheel-to-generator power transmission pinions and generators.

FIG. 5 is an enlarged front view of main rotary shaft 13 with several sets of different diameter of dual same-diameter pinions 11a to 11i and corresponding freewheels (not shown), with a set of external flywheels 9, a set of flywheel-to-generator power transmission pinions 10, and generators 5. FIG. 6 is a side perspective view of main shaft 13 with several sets of different diameter of dual same-diameter pinions 11a to 11i and corresponding freewheels (not shown), a set of external flywheels 9, a set of flywheel-to-generator power transmission pinions 10, and generators 5.

Figure 7:
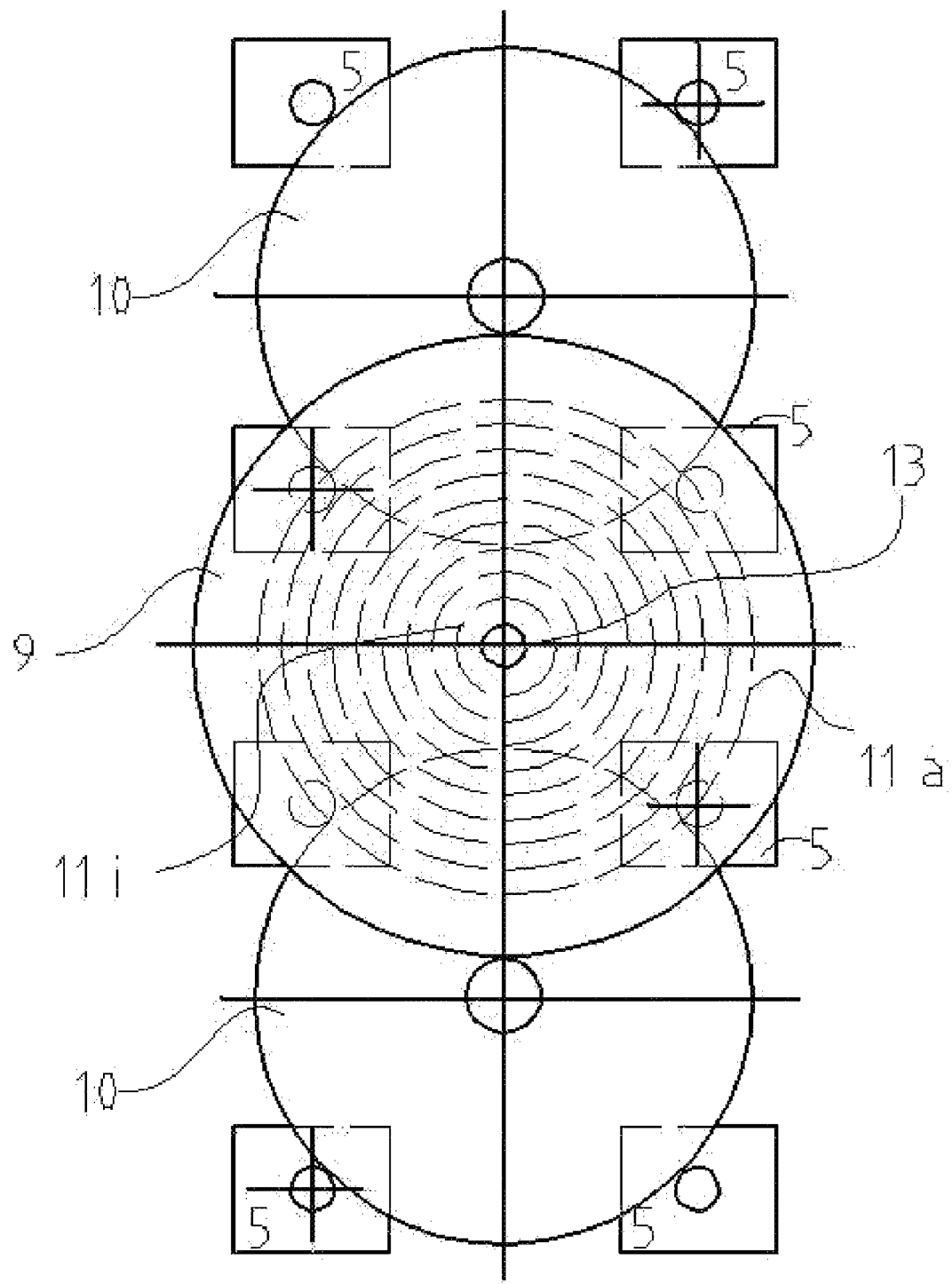
FIG. 7 is a side view of main rotary shaft with several sets of different diameter of dual same-diameter pinions with set of external flywheels, and a set of flywheel-to-generator power transmission pinions and generators.
Figure 8:
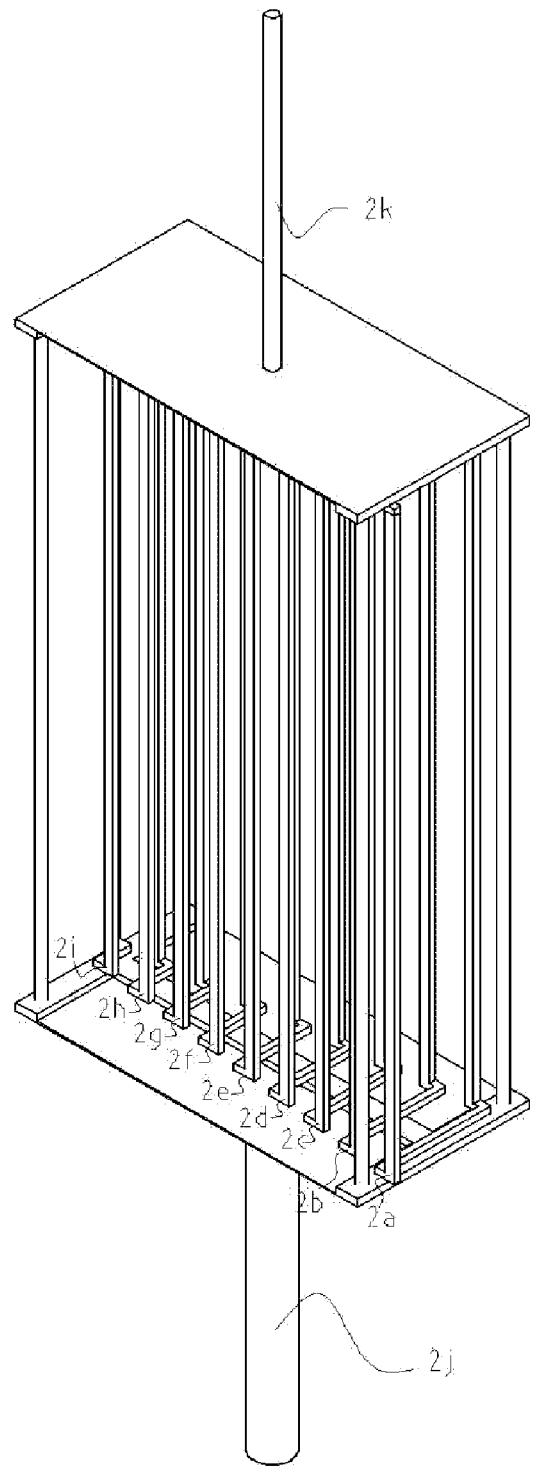
FIG. 8 is a side perspective view of the fork-like rod-actuating member.

FIG. 7 is a side view of view of the main shaft 13 with several sets of different diameter of dual same-diameter pinions 11a to 11i and corresponding freewheels (not shown), a set of external flywheels 9, a set of flywheel-to-generator power transmission pinions 10 and generators 5. FIG. 8 is a side perspective view of the fork-like rod system actuating member with sets of dual rods 2a to 2i, and the fork bottom supporting column 2j. This supporting column 2j encloses the fork-like rod system actuating member rising and lowering mechanical or hydraulic system. Also an upper guiding column 2k of the fork-like rod system actuating member is shown. The rods of the fork-like rod system actuating member could be attached or welded to metal sheets of appropriate width to enhance structural integrity of the system.

Figure 9:
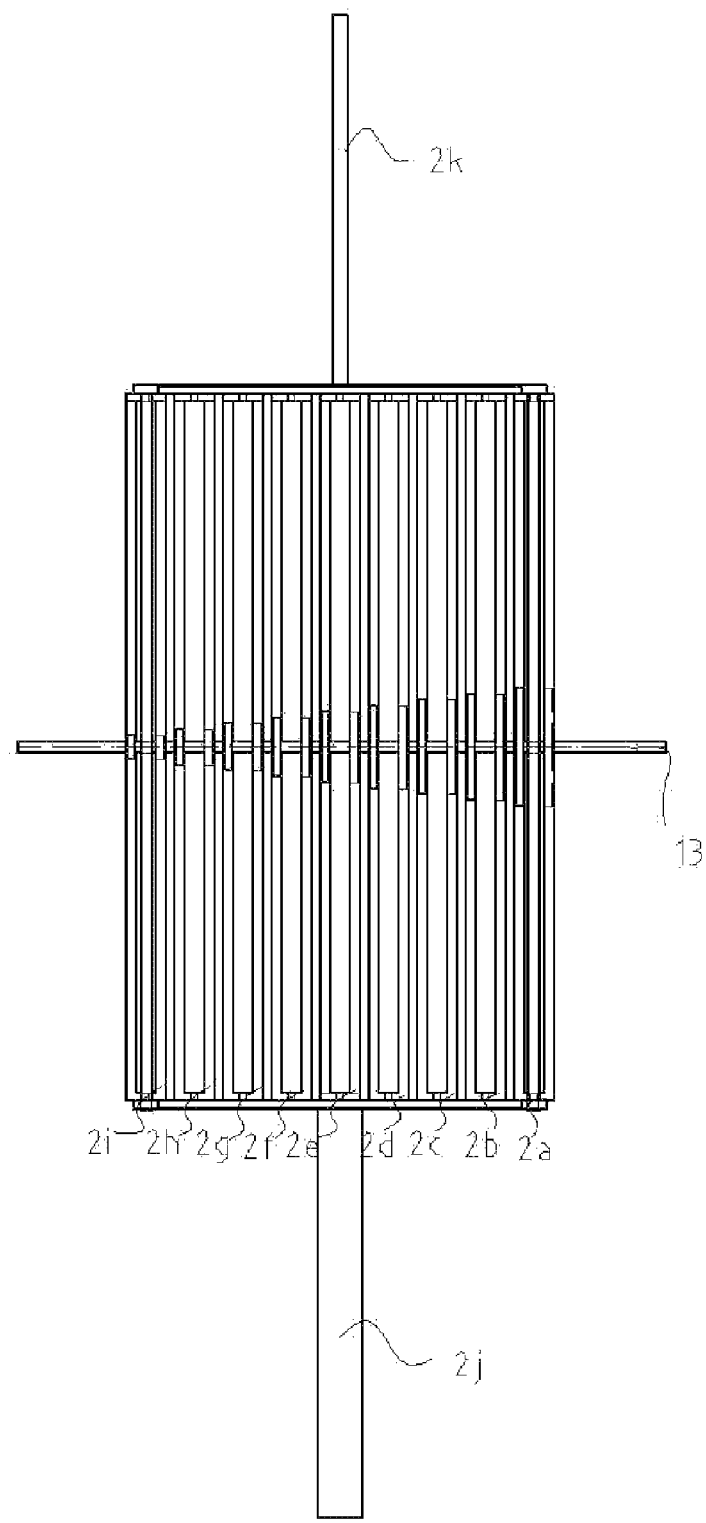
FIG. 9 is a front view of the fork-like rod-actuating member with the main rotary shaft with several sets of different diameter of dual same-diameter pinions.

FIG. 9 is a front view of fork-like rod system actuating member 2a to 2k with main rotary shaft 13 with several sets of different diameter of dual same-diameter pinions and corresponding freewheels (not shown) positioned at the center of the rods. Also shown is the fork bottom supporting column 2j. This supporting column 2j encloses the fork-like rod system actuating member rising and lowering mechanical or hydraulic or equivalent system. Also an upper guiding column 2k of the fork-like rod system actuating member is shown.

Figure 10:
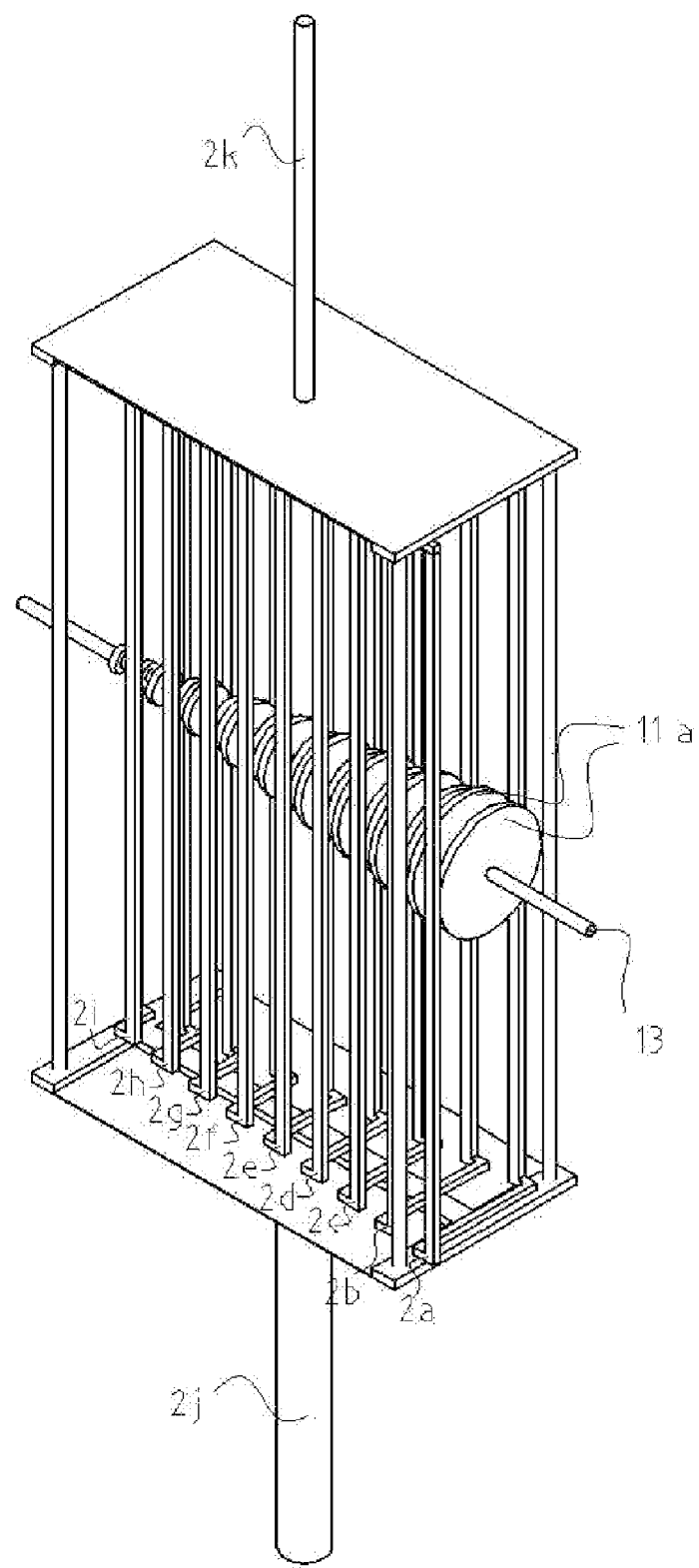
FIG. 10 is a side perspective view of the fork-like rod-actuating member with main rotary shaft with several sets of different diameter of dual same-diameter pinions.

FIG. 10 is a side perspective view of fork-like rod system actuating member 2a to 2k with main rotary shaft 13 with the several sets of different diameter of dual same-diameter pinions and corresponding freewheels (not shown) positioned at the center of the rods. Also shown is the fork bottom supporting column 2j. This supporting column 2j encloses the fork-like rod system actuating member rising and lowering mechanical or hydraulic or equivalent system. Also an upper guiding column 2k of the fork-like rod system actuating member is shown. The set of the greatest diameter dual same-diameter pinions 11a is also shown.

Referring to FIGS. 1-10, a few observations may be made. First, note that the various pinions are in constant mesh with corresponding rods at all times. Each set of dual same-diameter pinions may be selectively engaged to rotary shaft 13 through the use of an electromagnetic clutch or other mechanism as will be described below. As such, the present invention acts as a multi-speed linear transmission, converting the linear up and down motion produced by waves into a rotary motion on rotary shaft 13. In the illustrated embodiment, nine different "speeds" are shown to provide different transmission values to convert linear action at different wave heights to a relatively constant rotary speed on rotary shaft 13. However, other numbers of pinion and rod combinations may be provided within the spirit and scope of the present invention. Note also that in the embodiment illustrated herein, pinions are provided in pairs to convert, respectively, up and down linear motion from wave action to rotary motion on rotary shaft 13. As discussed further herein, the conversion of linear motion to rotary motion is not limited to merely the use of different pinion and gear set selection. Control systems provided in the present invention may also alter other aspects of the apparatus (ballast tanks, orientation to wave height, generator engagement, and the like) to maintain a constant rotary speed on rotary shaft 13 in response to varying wave conditions.

Figure 11:
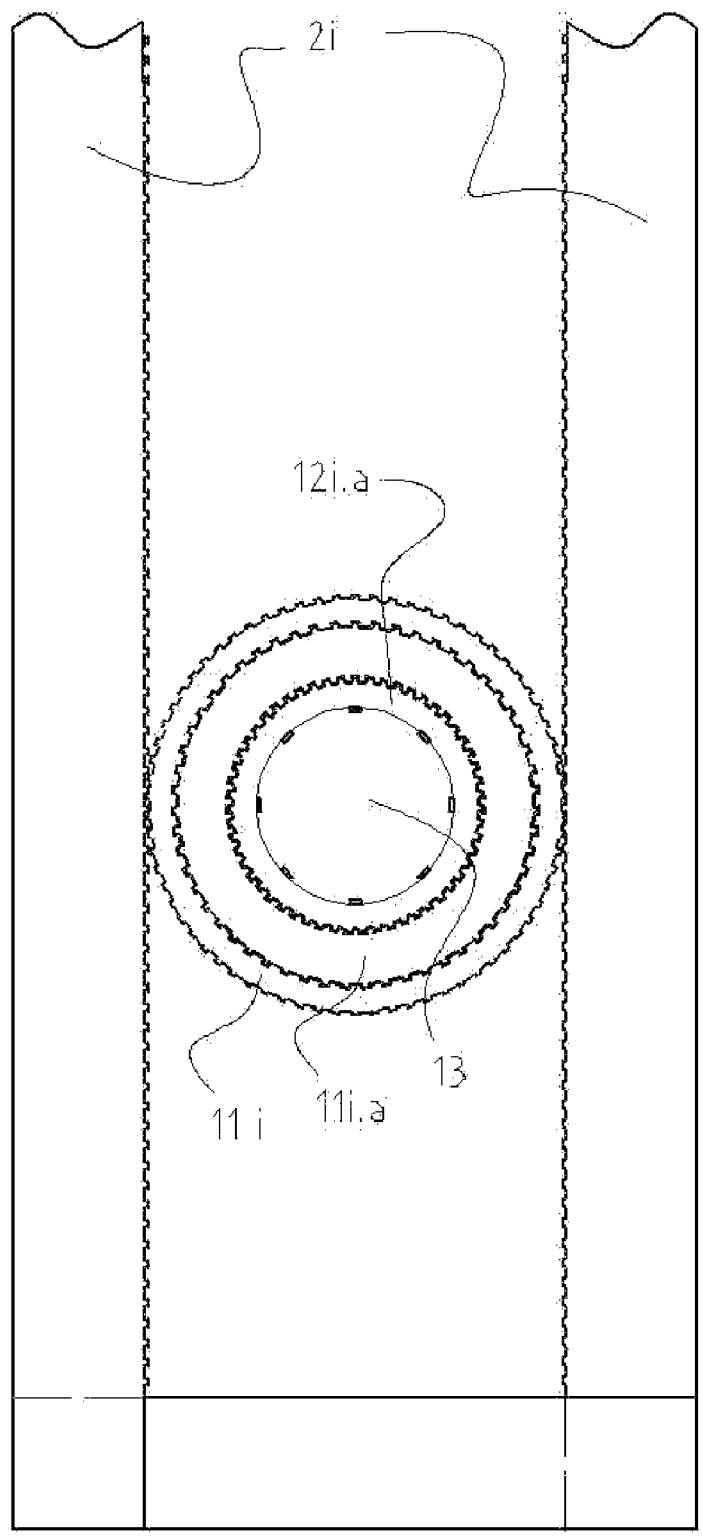
FIG. 11 is a side view of one set of dual pinions, with corresponding freewheels interacting with two rods of the fork-like rod-actuating member.
Figure 12:
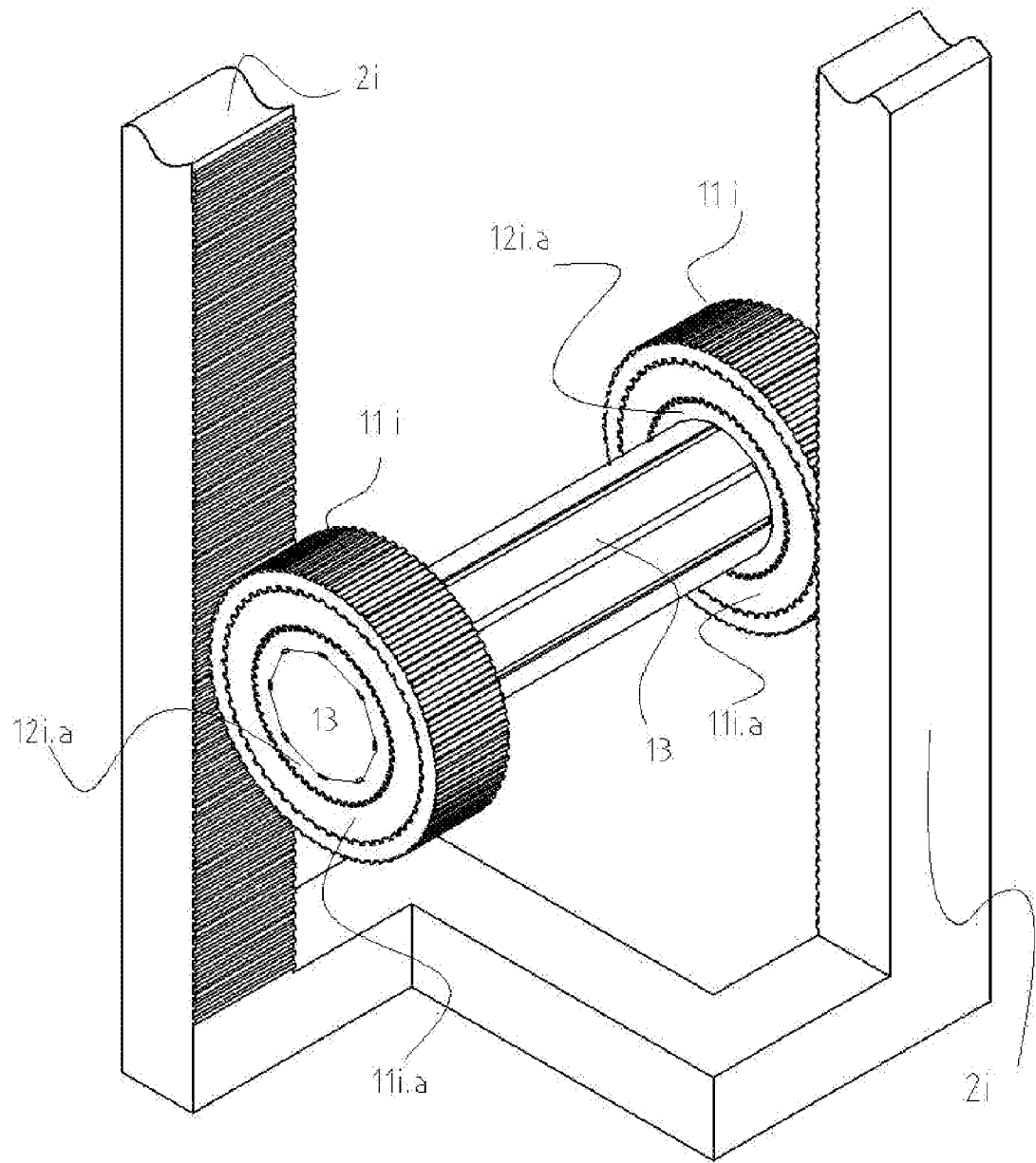
FIG. 12 is a side perspective view of one set of the dual same-diameter pinions and corresponding freewheel, interacting with two rods of the fork-like rod-actuating member.

FIG. 11 is a side view of a set of dual pinions 11i interacting with two rods set 2i of the fork-like rod system actuating member and corresponding freewheel 11i.a interacting with main rotary shaft 13 through engaging mechanism pinions 12i.a. The engaging mechanism (mechanical or electromagnetic clutch or equivalent) for the dual pinions is not shown. FIG. 12 is a side perspective view of a set of dual pinions 11i interacting with two rod sets (2i) of the fork-like rod system actuating member and corresponding freewheel 11i.a interacting with main rotary shaft 13 through the engaging mechanism pinions 12i.a. The engaging mechanism (mechanical or electromagnetic clutch or equivalent) is not shown. The perspective view of FIG. 12 better illustrates how individual pinions are engaged to corresponding rods in a constant mesh relationship.

Figure 13:
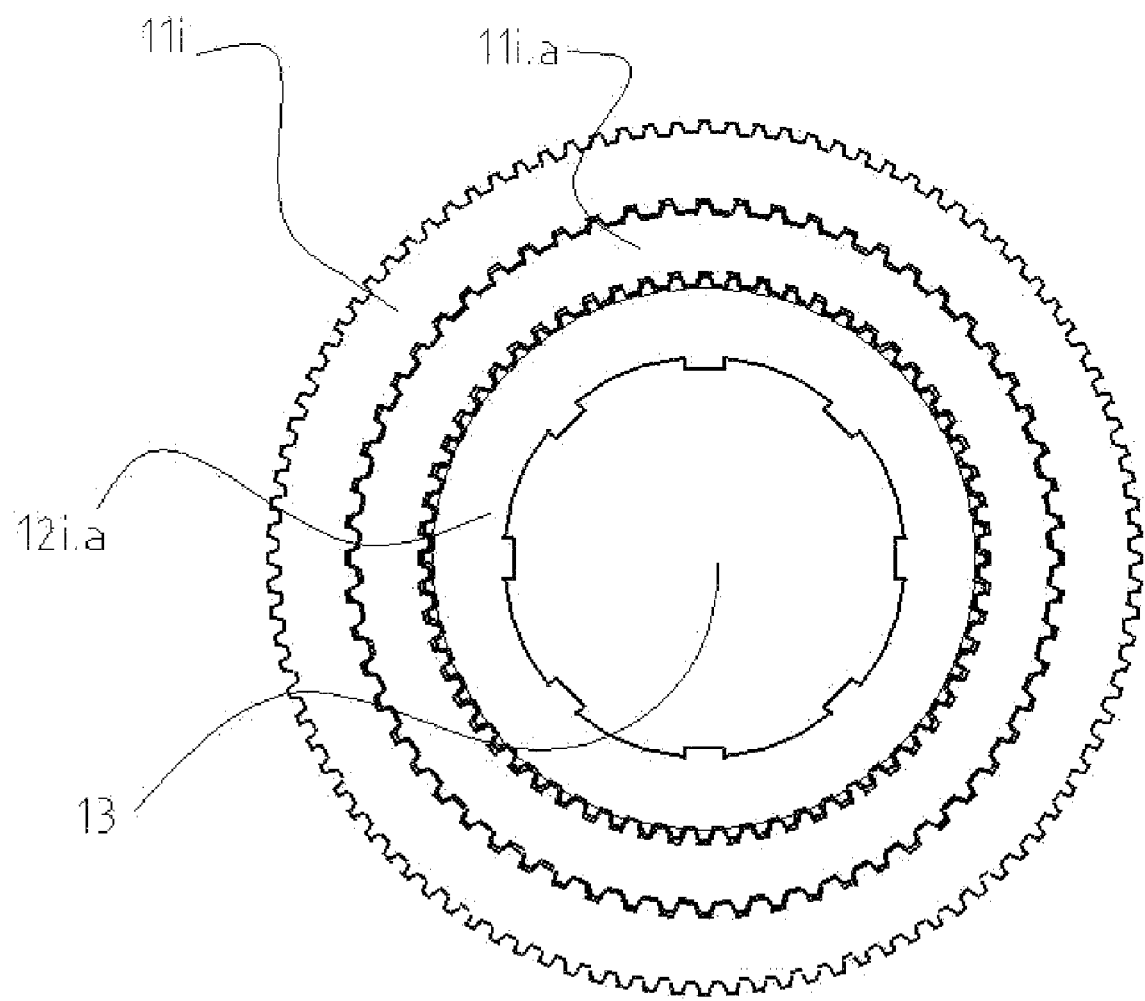
FIG. 13 is a side view of a dual pinion and a corresponding freewheel.
Figure 14:
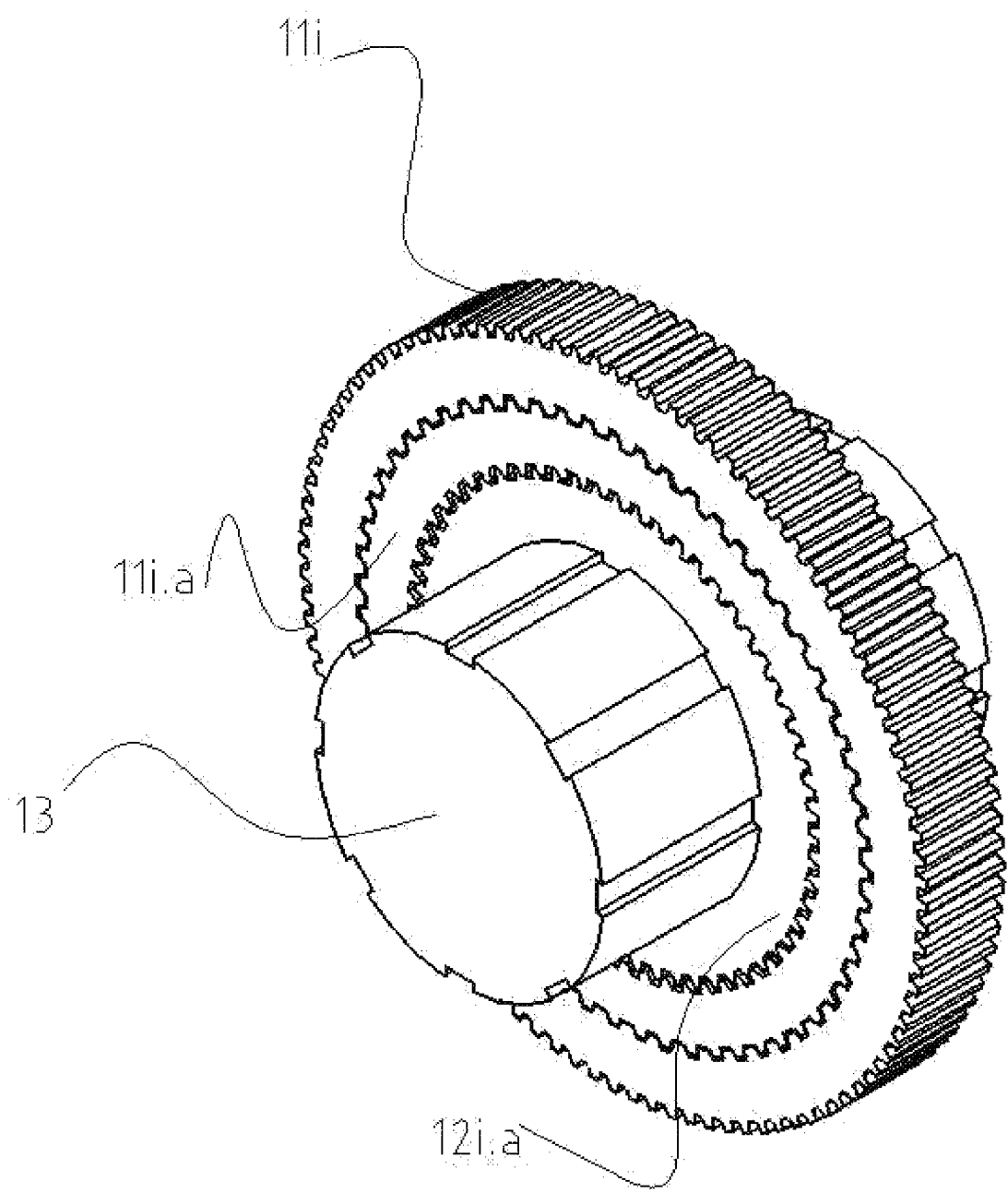
FIG. 14 is a side perspective view of a dual pinion and a corresponding freewheel.

FIG. 13 is a side view of a set of dual pinions 11i and corresponding freewheel 11i.a interacting with main rotary shaft 13 through the engaging mechanism pinions 12i.a. The engaging mechanism (mechanical or electromagnetic clutch or equivalent) is not shown. FIG. 14 is a side perspective view of set of dual pinions 11i and corresponding freewheel 11i.a interacting with main rotary shaft 13 through the engaging mechanism pinions 12i.a. The engaging mechanism (mechanical or electromagnetic clutch or equivalent) is not shown. The freewheels allow the gears to engage the main shaft in only one direction of rotation. Thus, the upward movement of the forks will rotate a corresponding freewheel in the desired direction of rotation, while the other corresponding pinion freewheels in an opposite direction. With the downward movement of the forks, the situation is reverses, with the formerly freewheeling pinion engaging the main shaft in the desired direction of rotation while the other formerly engaging pinion freewheeling in an opposite direction of rotation. Note that the freewheel mechanism is shown schematically only. The actual freewheel mechanism may comprise a roller clutch, a ratchet clutch, or other type of over-running clutch, freewheel mechanism or the like.

Figure 15:
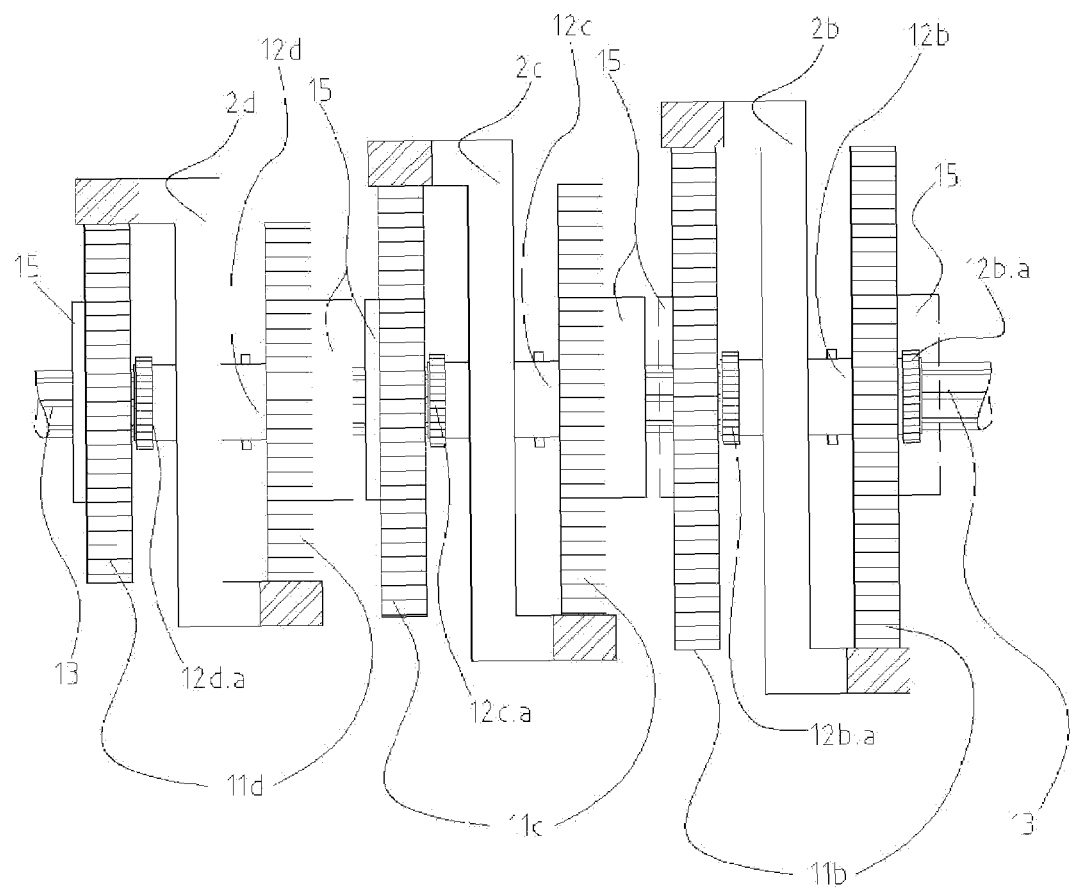
FIG. 15 is a top view of part of main shaft with three sets of different diameter of dual same-diameter pinions and their engaging mechanism, where the pinions are actuated by the rods of the fork-like rod-actuating member.
Figure 16:
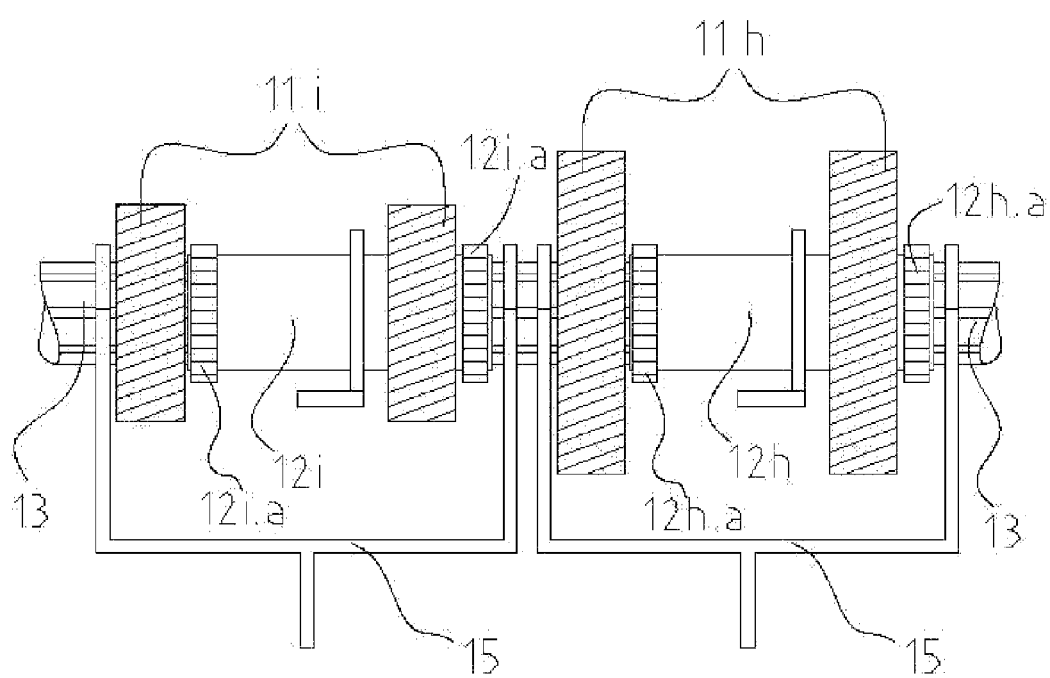
FIG. 16 is a side view of part of the main shaft with two sets of different diameters of dual same-diameter pinions and their engaging mechanism in the disengaged position.

FIG. 15 is a top view of part of main rotary shaft 13 with three sets of different diameter of dual same-diameter pinions 11b, 11c, and 11d and corresponding freewheels (not shown) and their corresponding mechanical engaging mechanism 12b, 12c, and 12d all in the disengaged position. Note engagement pinions 12b.a, where the dual same-diameter pinions 11b, 11c, and 11d are actuated by a set of rods 2b, 2c, and 2d of the fork-like rod system actuating member. The supporting bases 15 of the sets of dual same-diameter pinions are also shown. FIG. 16 is a side view of part of the main rotary shaft 13 with two sets of different diameter of dual same-diameter pinions 11h and 11i and corresponding freewheels (not shown) and their mechanical engaging mechanisms 12h and 12i in the disengaged position. Notice engaging pinions 12h.a and 12i.a outside the sets of dual same-diameter pinions 11h and 11i. The dual same-diameter pinions dual supporting bases 15 are also shown.

FIGS. 15 and 16 illustrate one embodiment of the "shifting" mechanism of the linear transmission of the present invention. In this embodiment, the rods 2b, 2c, 2d engage corresponding engaging mechanisms 12b, 12c, and 12d in a similar manner to the way shifting forks in a manual automotive transmission engage synchros in a constant-mesh transmission. Of course, other types of engagement mechanisms may be utilized in the present invention, including, but not limited to, electromagnetic clutches, hydraulic clutches, and the like. Note that in the embodiment of FIGS. 15 and 16, the engagement system, when used in conjunction with the freewheels requires that the pinions be "shifted" only when wave height conditions change. In other alternative embodiments, electromagnetic clutches or the like may replace both engaging mechanisms and freewheels and selectively engage and disengage pinions during portions of the up and down motion of the apparatus.

Figure 17:
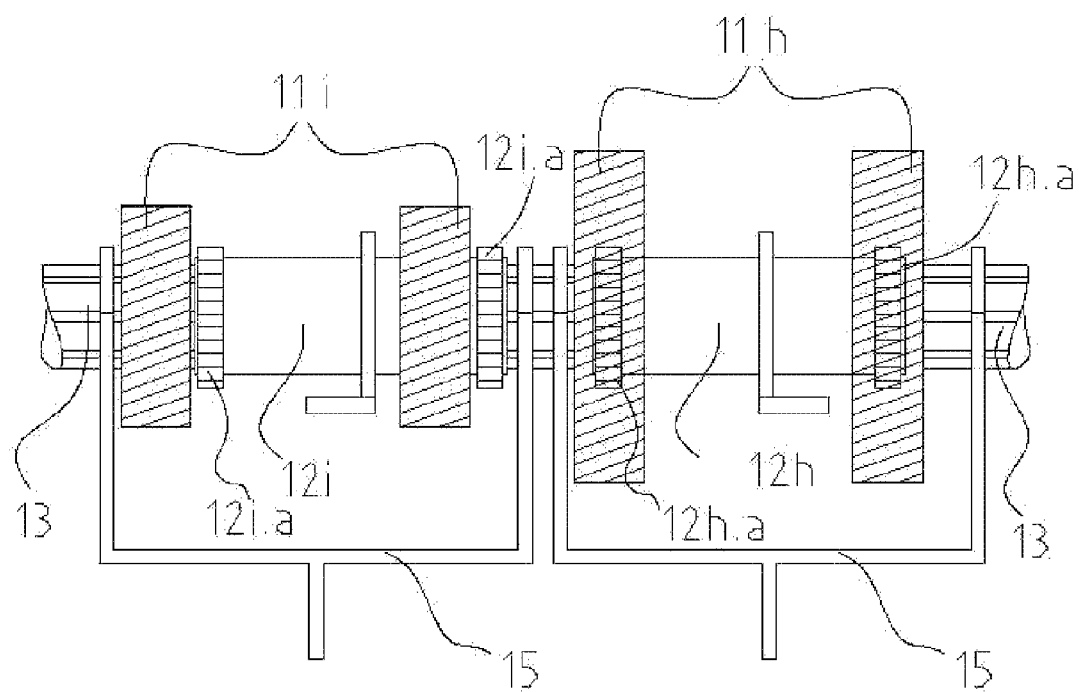
FIG. 17 is a side view of part of the main shaft with two sets of different diameter of dual same-diameter pinions and the engaging mechanism of right side dual same-diameter pinion in the engaged position.

FIG. 17 is a side view of part of the main rotary shaft 13 with two sets of different diameter of dual same-diameter pinions 11*h* and 11*i* and corresponding freewheels (not shown) and corresponding mechanical engaging mechanisms 12*h* and 12*i*. Mechanical engaging mechanism 12*i* is in the disengaged position. Mechanical engaging mechanism 12*h* is in the engaged position. Notice engaging pinions 12*i.a* outside the sets of dual same-diameter pinions 11*i*. Notice engaging pinions 12*h.a* inside the sets of dual same-diameter pinions 11*h*. The dual same-diameter pinions dual supporting bases 15 are also shown.

Figure 18:
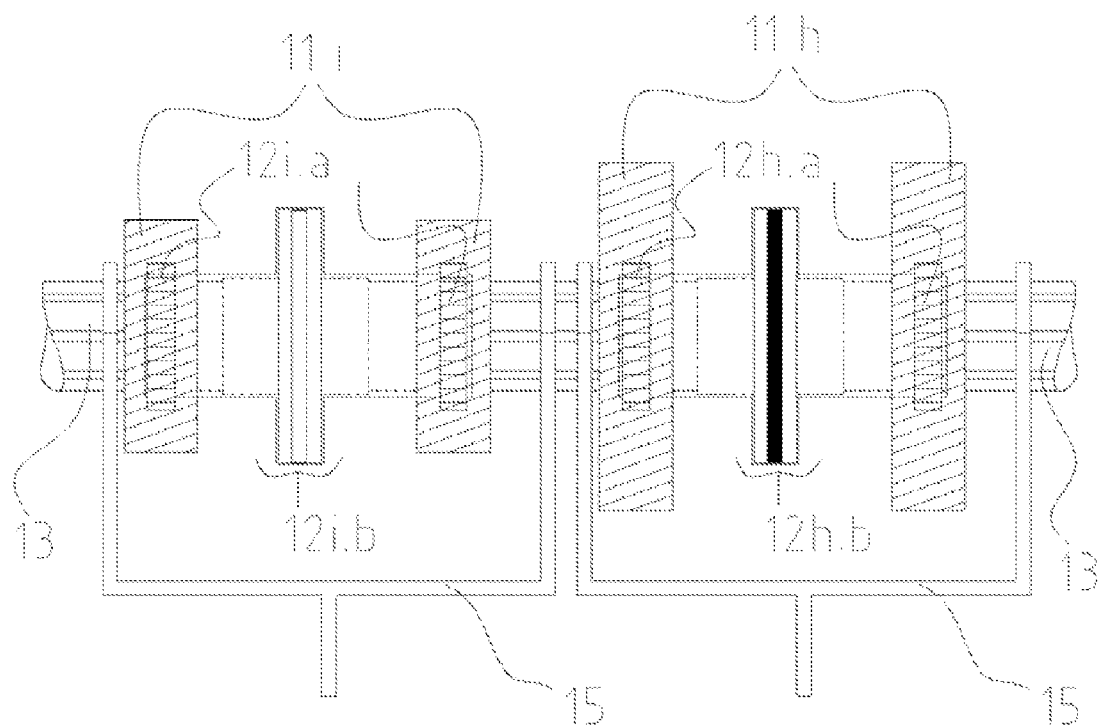
FIG. 18 is a side view of part of the main shaft with two sets of different diameter of dual same-diameter pinions and corresponding freewheels (not shown) and their electromagnetic clutch engaging mechanism with the right side dual same-diameter pinion electromagnetic clutch in the engaged position.

FIG. 18 is a side view of an alternative embodiment of the present invention showing part of the main rotary shaft 13 with two sets of different diameter of dual same-diameter pinions 11*h* and 11*i* and corresponding freewheels (not shown) and their electromagnetic clutch engaging mechanisms 12*h* and 12*i*. Electromagnetic clutch engaging mechanism 12*i* is in the disengaged position. Electromagnetic clutch engaging mechanism 12*h* is in the engaged position. Notice engaging pinions 12*i.a* inside the sets of dual same-diameter pinions 11*i*. Notice engaging pinions 12*h.a* inside the sets of dual same-diameter pinions 11*h*. The dual same-diameter pinions dual supporting bases 15 are also shown.

In this embodiment, one electromagnetic clutch is provided for each pinion pair, with freewheels (e.g., overrunning clutches) allowing the gears to move in opposite directions relative to the rotary shaft. As noted above, dual electromagnetic clutches may also be used to selectively engage individual set pinions during different portions (up and down) of the stroke of the linear mechanism.

Figure 19:
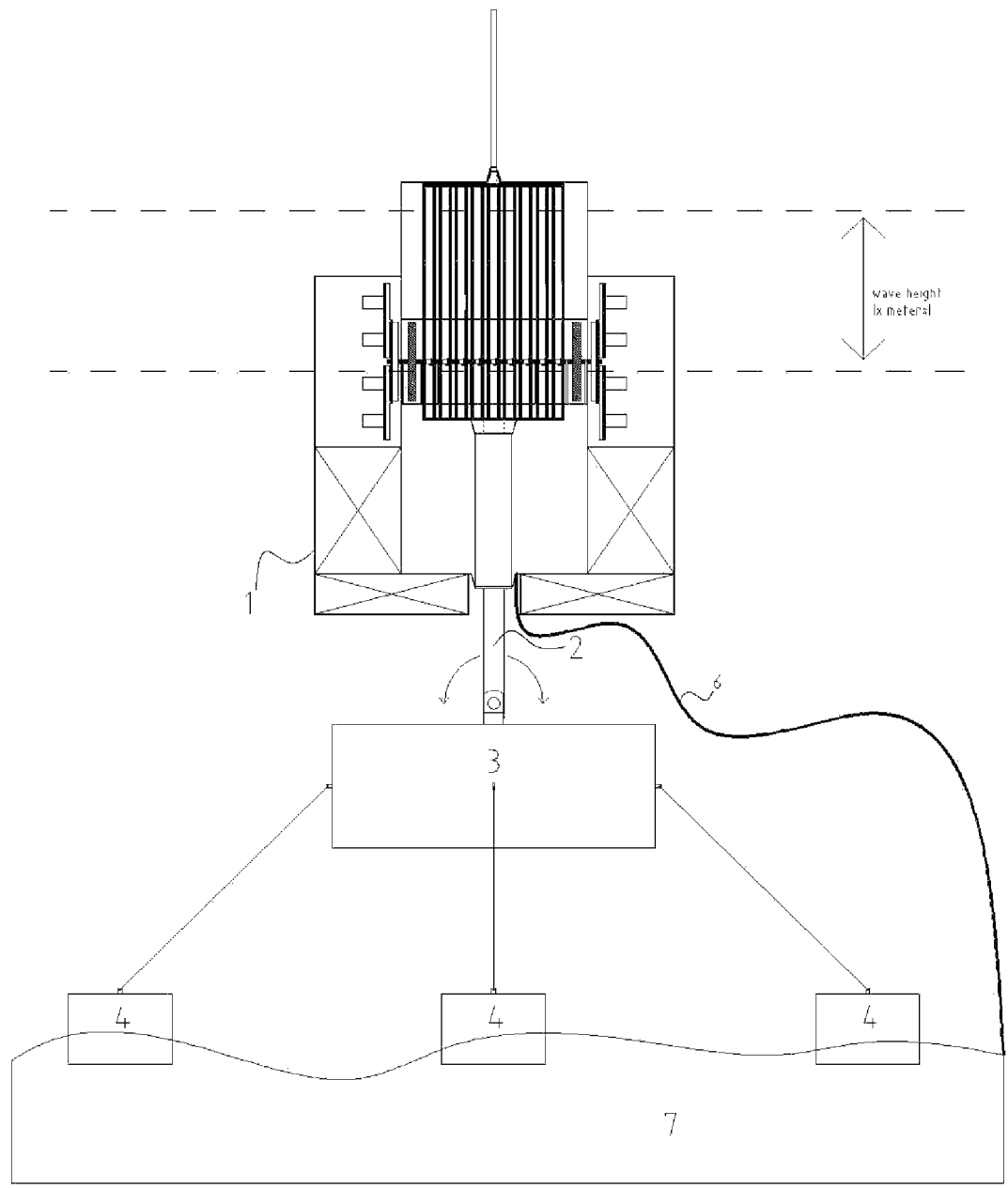
FIG. 19 is a front view of the wave energy converter with the moving floating member (hull) at a lowest point.
Figure 20:
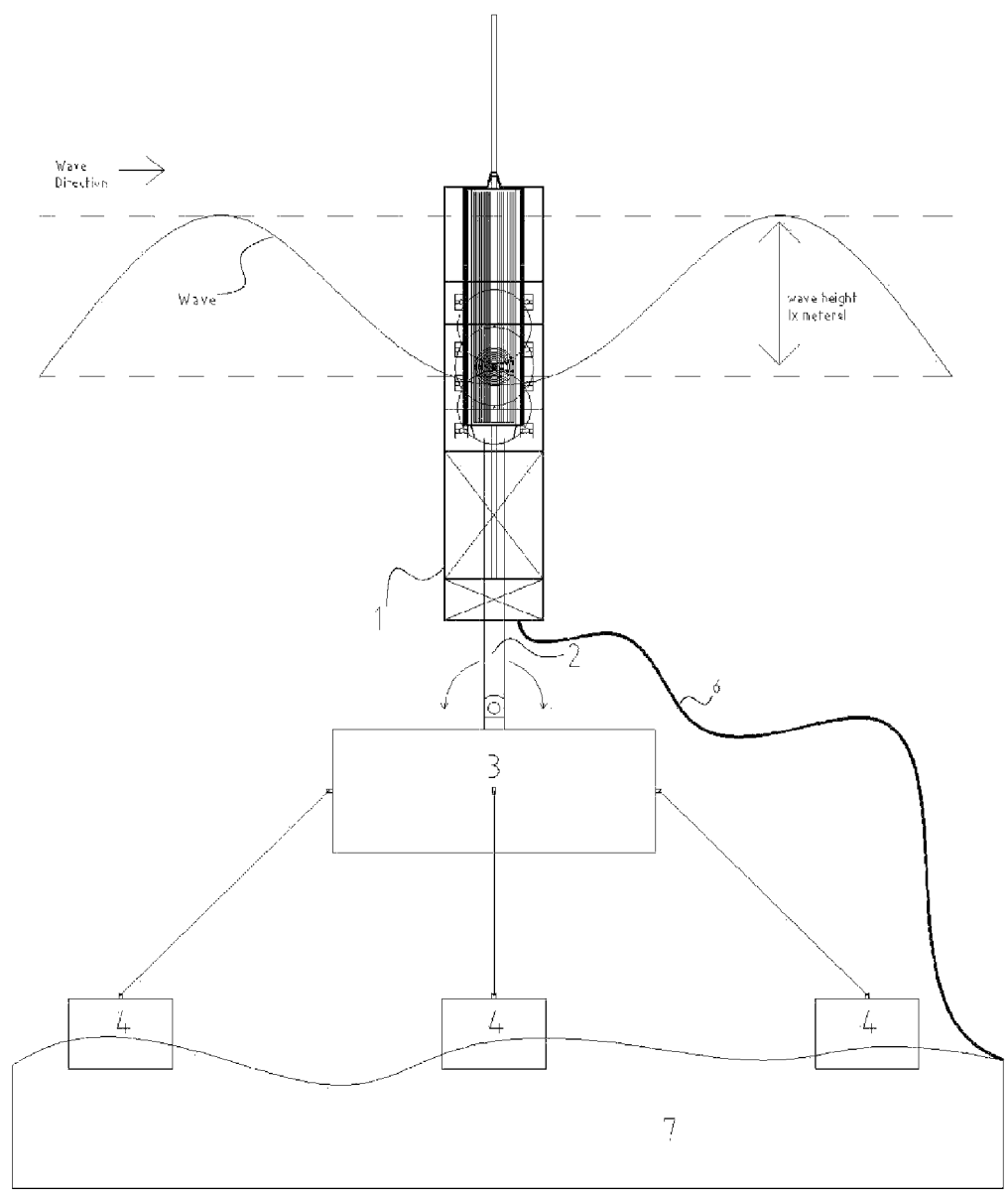
FIG. 20 is a side view of the wave energy converter with the moving floating member (hull) at a lowest point.

FIG. 19 is a front view of the wave energy converter with the moving floating member (hull) 1 at a lowest point. Note that hull or floating member 1 is at a lowest point with respect to underwater floating base 3. Also, note the top of fork-like rod system actuating member 2 is very close to hull 1. Also shown are underwater floating base 3, weights 4, cable 6 to carry power generated by the device to shore, and seabed 7. FIG. 20 is a side view of the wave energy converter with moving floating member (hull) 1 at a lowest point. Note hull or floating member 1 is at a lowest point with respect to underwater floating base 3. Also, note the top of fork-like rod system actuating member 2 very close to hull 1. Also shown are the underwater floating base 3, weights 4, cable 6 to carry power generated by the device to shore, and seabed 7. Note also wave direction and position with respect to the floating hull 1.

In the situation illustrated in FIGS. 19 and 20, pinion gears are at risk of running to the end of the fork-like rod system actuating member 2, which may result in gear damage or less than optimal transfer of power. If a pinion reaches the end of the stroke of fork-like rod system actuating member 2, then the corresponding freewheel (overrunning clutch) may allow the rotary shaft to continue to rotate. However, the sudden abrupt stopping of the pinion may shock-load the linear transmission. Suitable shock-absorption means may be provided to minimize such impacts. It would be desirable, however, to prevent such situations, not only from a durability standpoint, but also to maximize power generation capability. If a pinion reaches the end of its travel, then it is no longer transmitting energy to the rotary shaft. As many areas of the world are subject to tidal and other variations in water depth, it is important to provide a means for compensating for average water height, to prevent such run-out of the pinion gears. Control System B may be employed to maintain the average distance that the sets of dual same-diameter pinions run on the rods of the fork-like rod system centered on the center of the rods as previously discussed.

Figure 21:
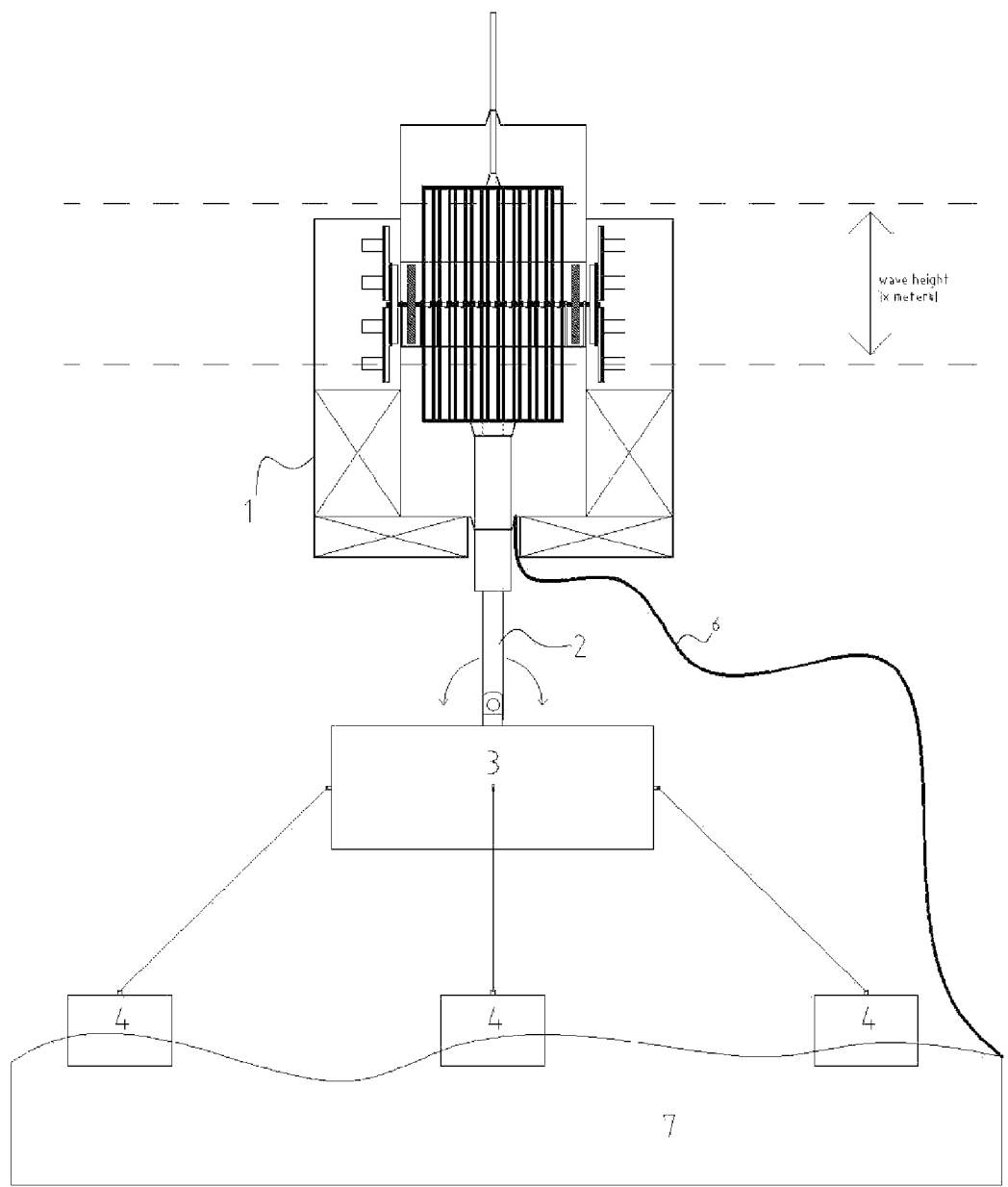
FIG. 21 is a front view of the wave energy converter with the moving floating member (hull) at mid-point.
Figure 22:
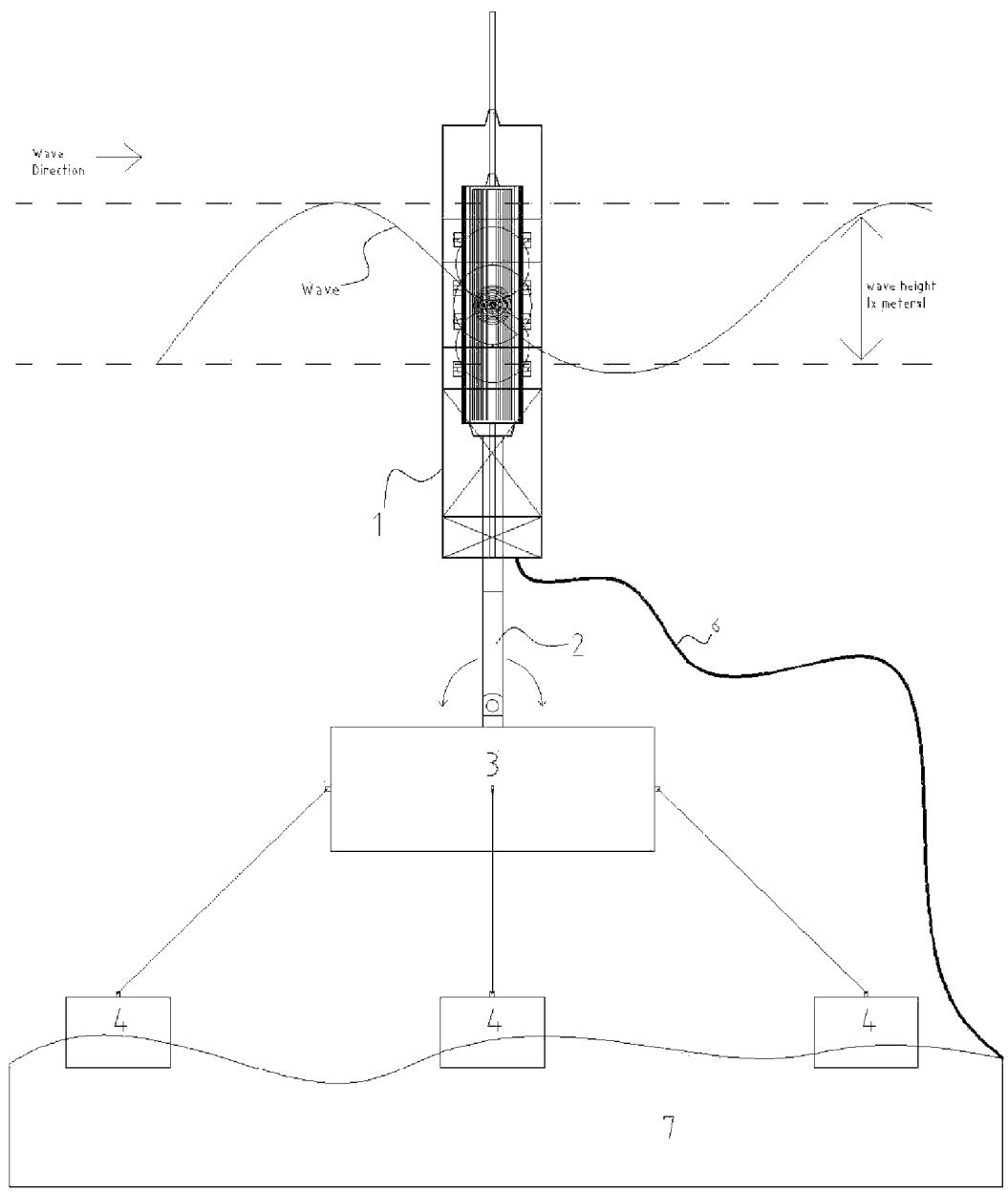
FIG. 22 is a side view of the wave energy converter with the moving floating member (hull) at mid-point.

FIG. 21 is a front view of the wave energy converter with moving floating member (hull) at mid-point. Notice the top of fork-like rod system actuating member 2 is at a certain distance to hull 1. Also shown are underwater floating base 3, weights 4, cable 6 to carry power generated by the device to shore, and seabed 7. FIG. 22 is a side view of the wave energy converter with moving floating member (hull) 1 at a mid-point. Note the top of fork-like rod system actuating member 2 is at a certain distance to hull 1. Also shown are underwater floating base 3, weights 4, cable 6 to carry power generated by the device to shore, and seabed 7. Note wave direction and position with respect to the floating hull 1.

In the situation illustrated in FIGS. 21 and 22, the pinions are centered relative to the fork-like rod system in the center of their stroke during the wave action. This is a desirable condition, as the pinions do not over-run the fork-like rod system and the maximum amount of energy can be transmitted to the rotary shaft. As detailed further herein, the control system may attempt to maintain the apparatus in such a state so as to prevent overrunning of the pinions relative to the fork-like rod system as discussed below in connection with FIG. 32.

Figure 23:
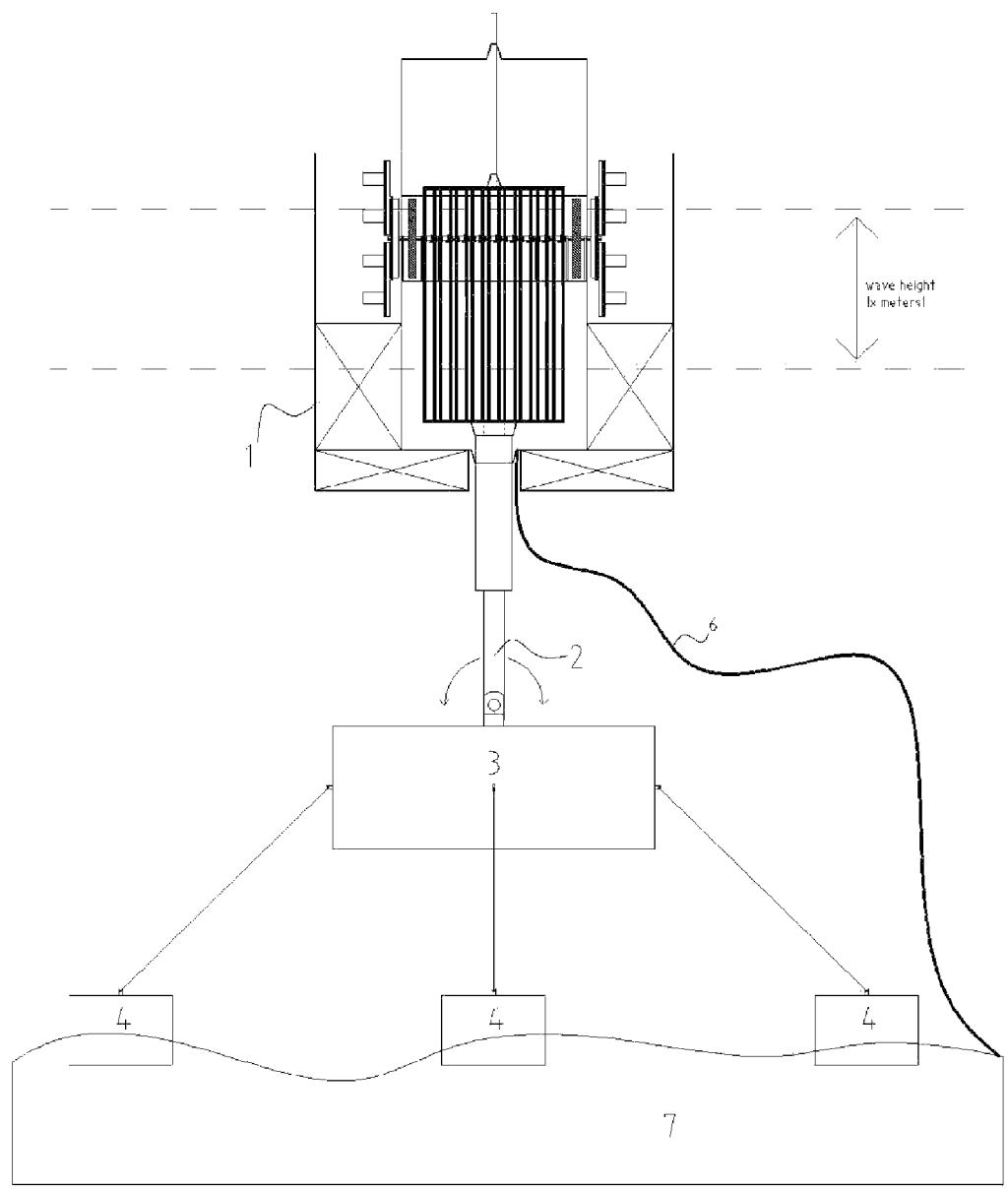
FIG. 23 is a front view of the wave energy converter with the moving floating member (hull) at a highest point.
Figure 24:
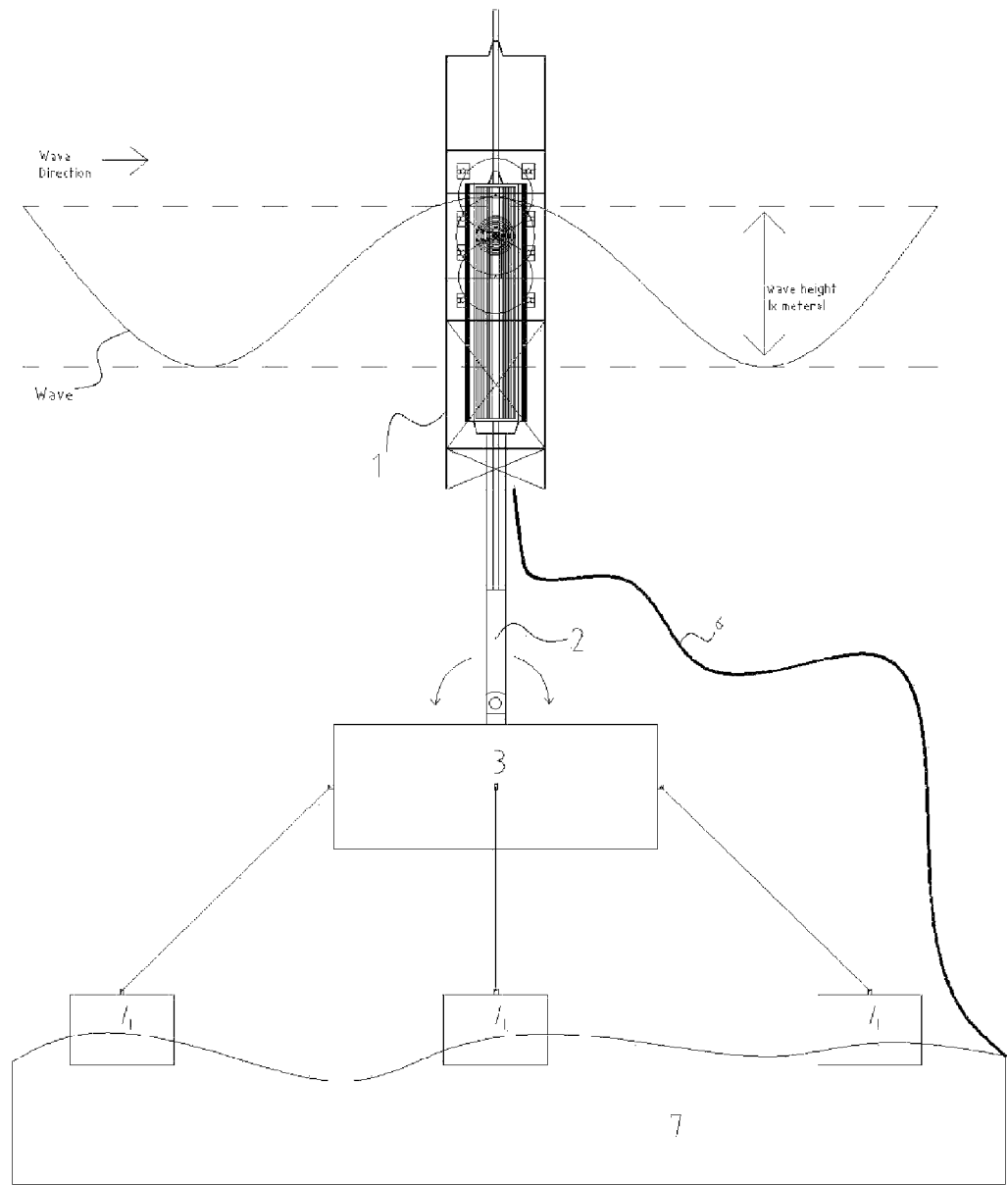
FIG. 24 is a side view of the wave energy converter with the moving floating member (hull) at a highest point.

FIG. 23 is front view of the wave energy converter with moving floating member (hull) 1 at a highest point. Note the top of fork-like rod system actuating member 2 is at a certain distance to hull 1. Also shown are underwater floating base 3, weights 4, cable 6 to carry power generated by the device to shore, and seabed 7. FIG. 24 is a side view of the wave energy converter with moving floating member (hull) 1 at a highest point. Note the top of fork-like rod system actuating member 2 at a certain distance to hull 1. Also shown are underwater floating base 3, weights 4, cable 6 to carry power generated by the device to shore, and seabed 7. Note wave direction and position with respect to the floating hull 1.

Figure 25:
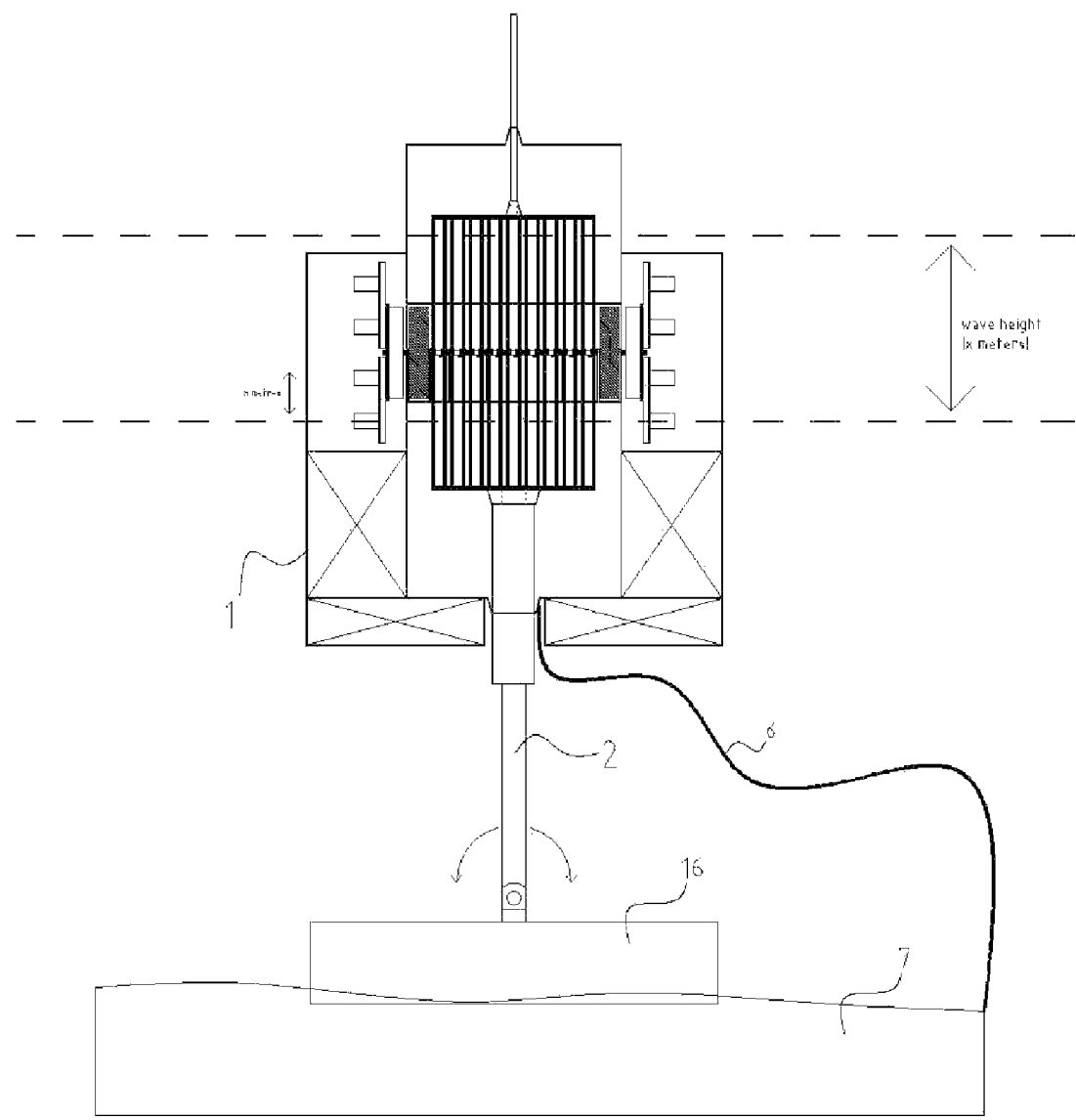
FIG. 25 is a front view of the wave energy converter with moving floating member (hull) at mid-point with fork-like rod-actuating member attached to a base on the seabed.
Figure 26:
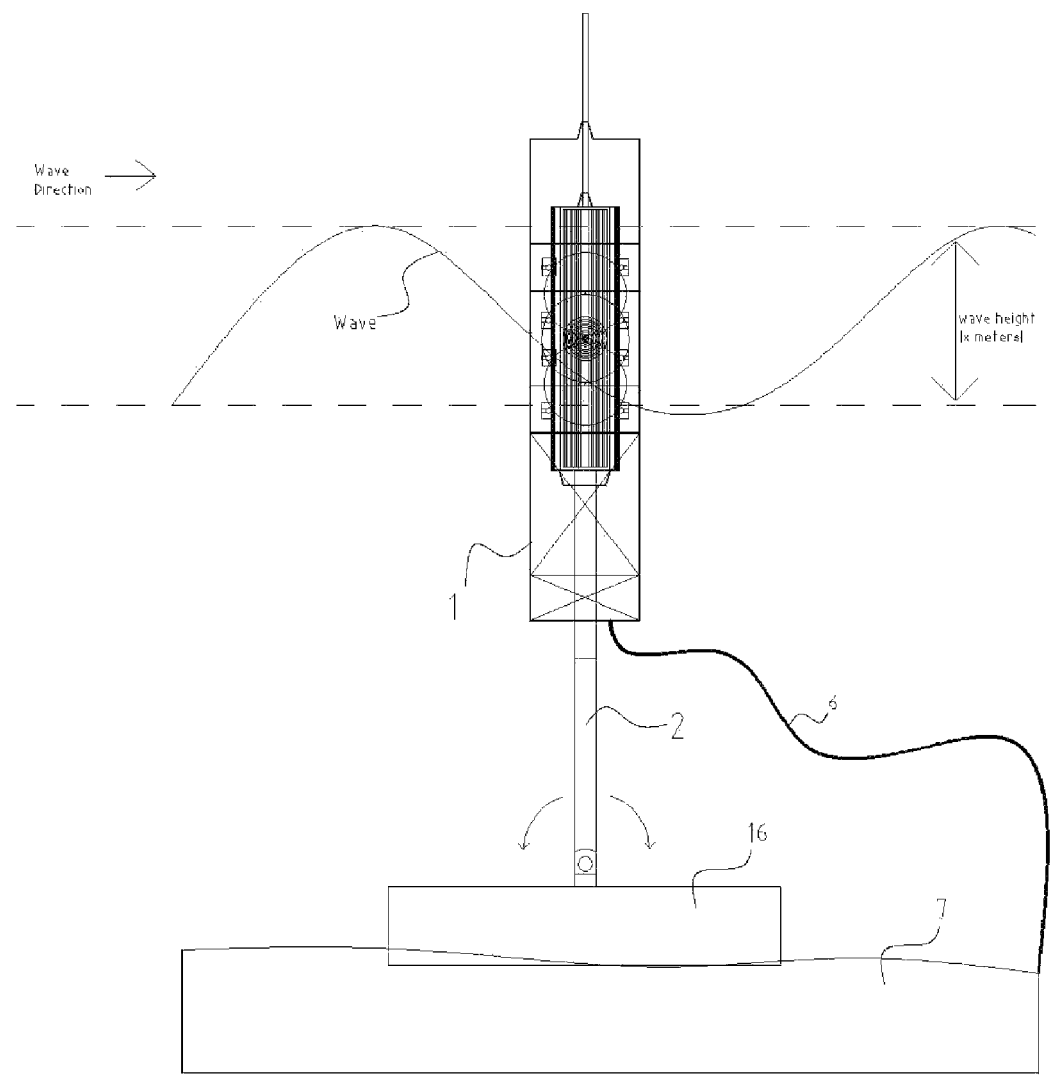
FIG. 26 is a side view of the wave energy converter with moving floating member (hull) at mid-point with fork-like rod-actuating member attached to a base on the seabed.

FIG. 25 is a front view of the wave energy converter with moving floating member (hull) at mid-point with fork-like rod system actuating member 2 attached to a base on the seabed 16. Note the top of fork-like rod system actuating member 2 is at a certain distance to hull 1. Also shown are cable 6 to carry power generated by the device to shore, and seabed 7. FIG. 26 is a side view of the wave energy converter with moving floating member (hull) at a mid-point with fork-like rod system actuating member 2 attached to a base on the seabed 16. Note the top of fork-like rod system actuating member 2 is at certain distance to hull 1. Also shown are cable 6 to carry power generated by the device to shore, and seabed 7. Note wave direction and position with respect to the floating hull 1.

Figure 27:
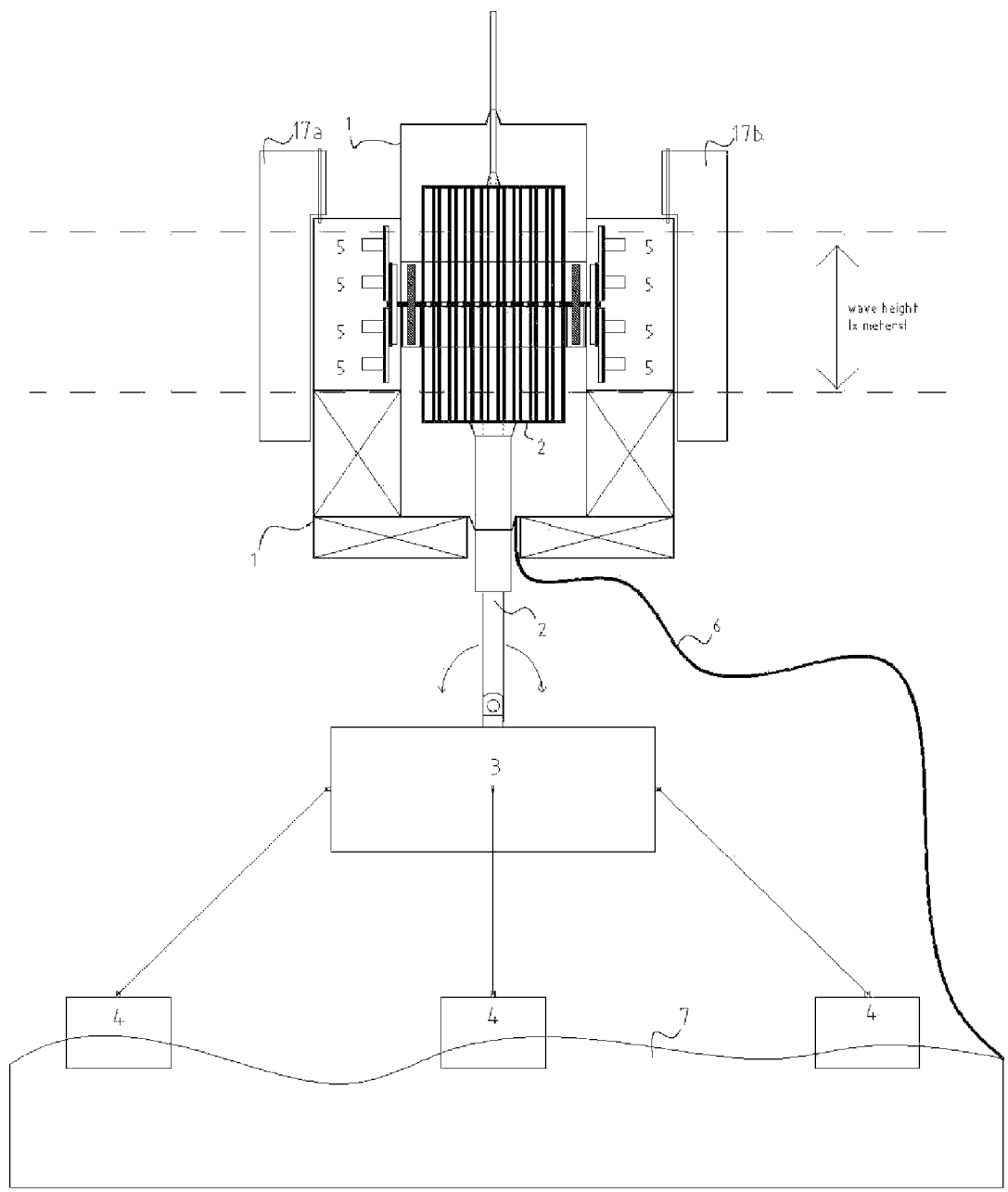
FIG. 27 is a front view of the wave energy converter with hull self-orienting fins in position for maximum energy extraction per wave crest.
Figure 28:
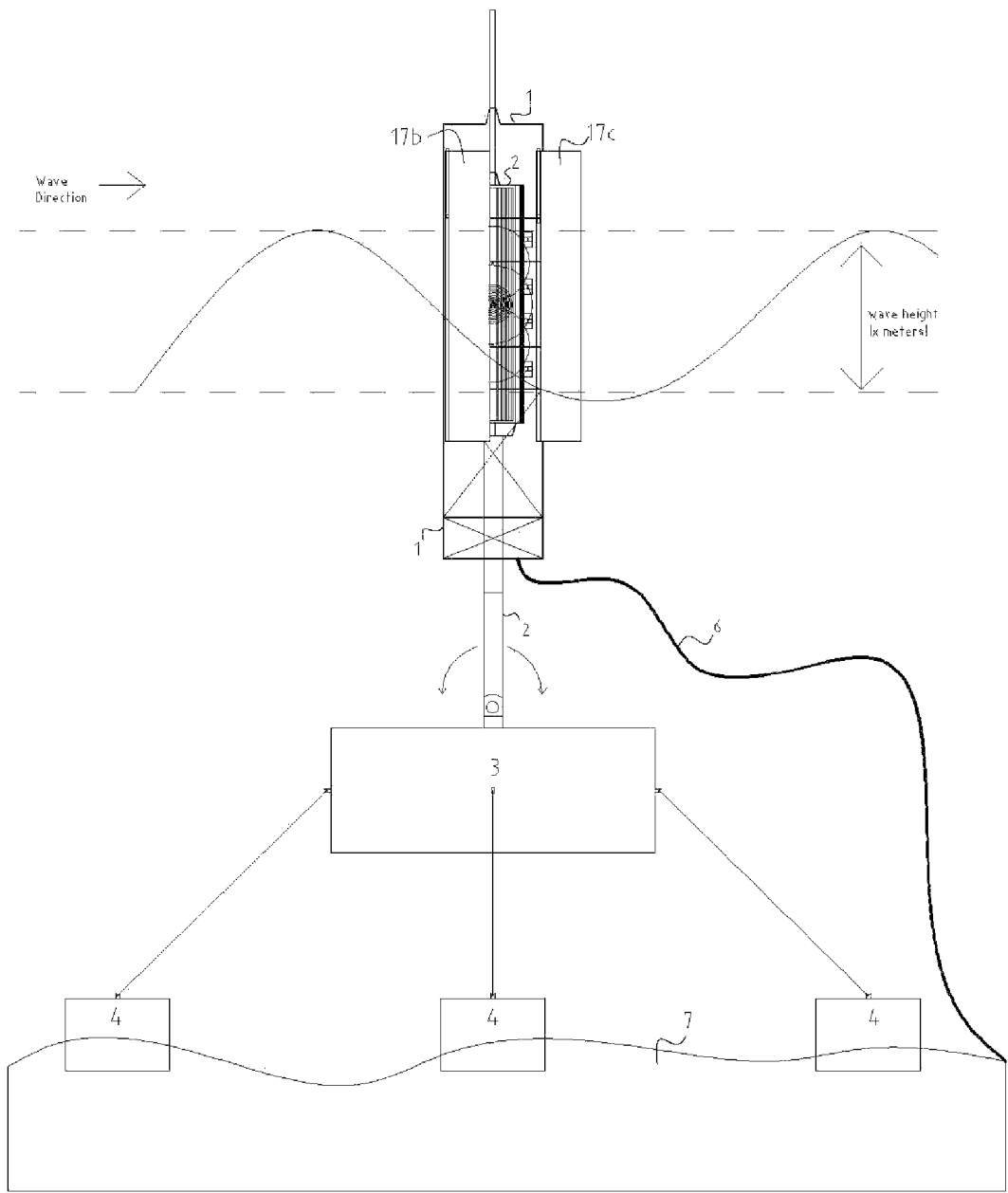
FIG. 28 is a side view of the wave energy converter with hull self-orienting fins in position for maximum energy extraction per wave crest.

FIG. 27 is a front view of the wave energy converter with moving floating member or hull 1 at a mid-point with self-orienting fins, front left fin 17*a* and front right fin 17*b*, in position to maintain the floating frame or hull oriented in a manner to absorb the greatest amount of energy per wave crest (longitudinal axis of the hull or frame parallel to incoming waves). Also shown are underwater floating base 3, weights 4, generators 5, cable 6 to carry power generated by the device to shore, and seabed 7. FIG. 28 is a side view of the wave energy converter with moving floating member or hull 1 at mid-point with self-orienting fins, front right fin 17b and rear right fin 17c, in position to maintain the floating frame or hull oriented in a manner to absorb the greatest amount of energy per wave crest (longitudinal axis of the hull or frame parallel to incoming waves). Also shown are underwater floating base 3 weights 4, cable 6 to carry power generated by the device to shore, and seabed 7. Note wave direction and position with respect to the floating hull 1. The self-orienting fins 17a-17d may be used to orient the wave energy converter to provide the optimal stroke for the apparatus depending upon wave conditions. During heavy seas, the apparatus may orient itself in such a manner as to reduce the amount of energy absorbed from wave action, and thus limit the stroke of the apparatus and prevent the pinions from overrunning the forks rods.

Figure 29:
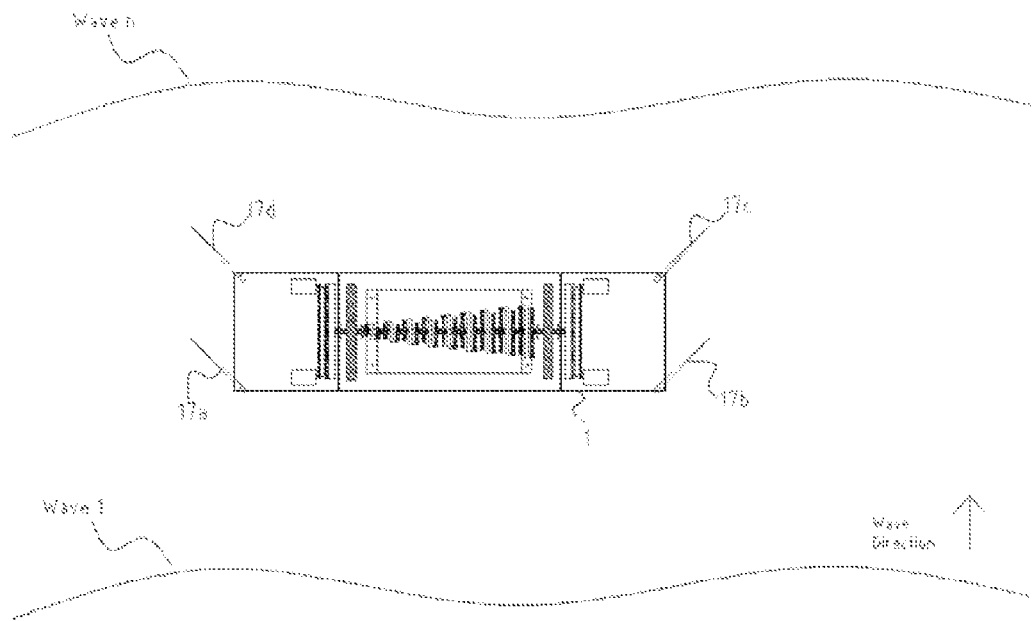
FIG. 29 is a top view of the wave energy converter with hull self-orienting fins in position for maximum energy extraction per wave crest.
Figure 30:
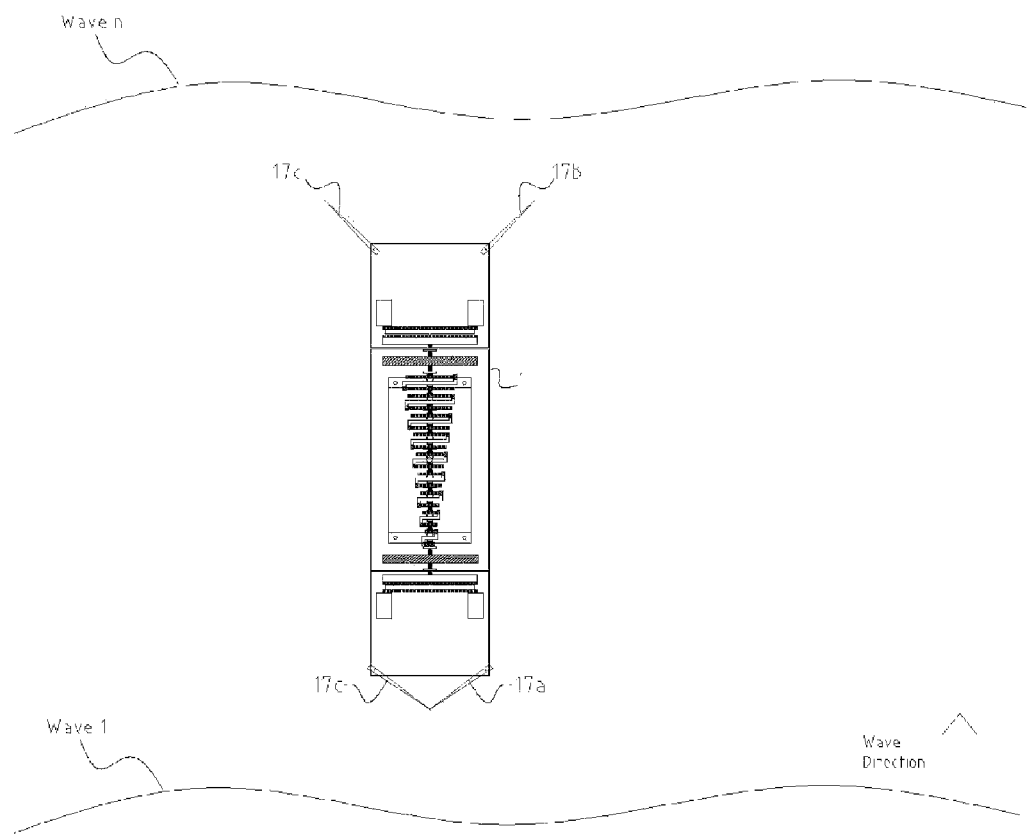
FIG. 30 is a top view of the wave energy converter with hull self-orienting fins in position for minimum energy extraction per wave crest.

FIG. 29 is a top view of the wave energy converter with self-orienting fins, front left fin 17a and front right fin 17b and rear right fin 17c and rear left fin 17d, in position to maintain the floating frame or hull 1 oriented in a manner to absorb the greatest amount of energy per wave crest (longitudinal axis of the hull or frame parallel to incoming waves). Note wave direction with respect to the floating hull 1. FIG. 30 is a top view of the wave energy converter with self-orienting fins, front left fin 17a and front right fin 17b and rear right fin 17c and rear left fin 17d, in position to maintain the floating frame or hull 1 oriented in a manner to absorb the minimum amount of energy per wave crest (longitudinal axis of the hull or frame perpendicular to incoming waves). Note wave direction with respect to floating hull 1. In this scenario, the fins 17a-17d may be orientated such that the minimum amount of energy is transmitted to the hull. This orientation may be used when wave heights are equal to or more than the stroke of the fork rods.

Figure 31:
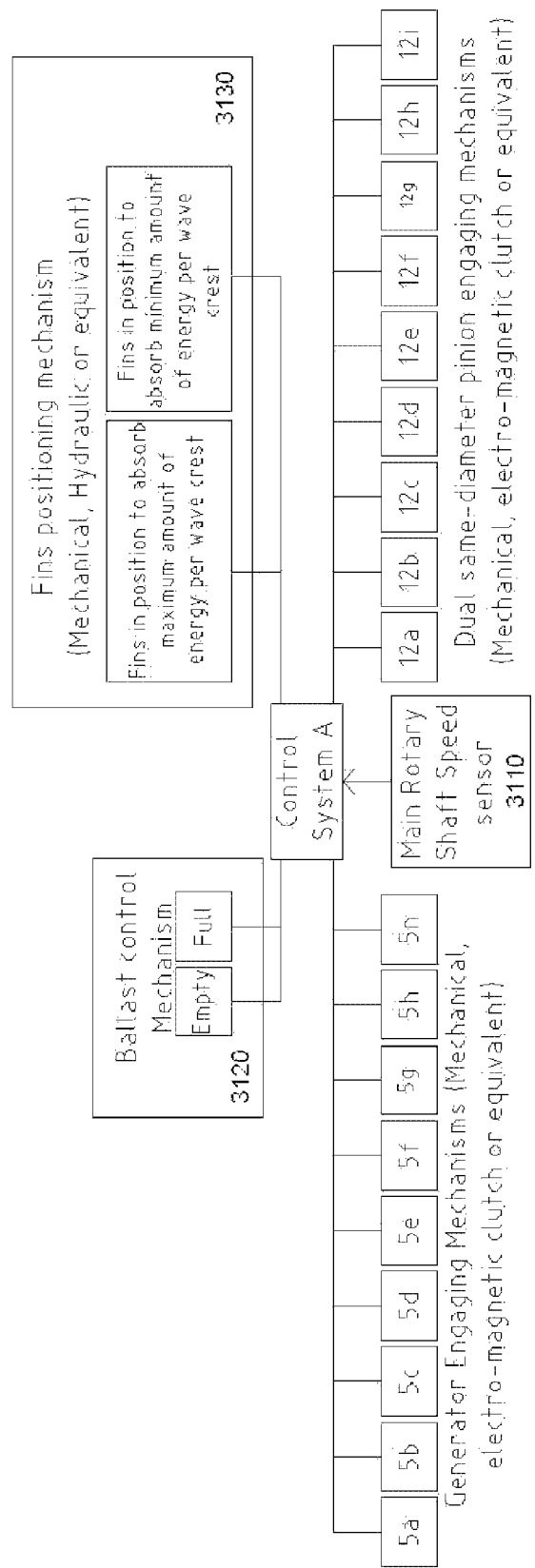
FIG. 31 is a block diagram of Control System A for controlling engagement and disengagement of sets of dual same-diameter pinions and generators, fins positioning mechanism, and ballast tank filling mechanism.

FIG. 31 is a block diagram for Control System A for controlling engagement and disengagement of sets of dual same-diameter pinions and generators, fin positioning mechanism, and ballast tank filling mechanism. As previously described, only one set of dual same-diameter pinions may be engaged at any time in response to varying sea heights and conditions. Control system A may be provided with a number of sensor inputs, such as main rotary shaft speed sensor 3110. Control System A may then send signals to various actuators to maintain a desired rotational speed on the rotary shaft. Note that other sensors (not shown) may also be used in the control algorithm of Control System A, including but not limited to, sensors indicating stroke length, wave height, weather conditions, power output, and the like.

In response to control inputs, Control System A may actuate ballast control mechanism 3120 to empty or fill ballast tanks. As ballast tanks are emptied or filled, the amount of energy absorbed by the system may be altered, and moreover, the average location of the pinions relative to the fork-like rods may be changed, to compensate for wave height and ocean level (e.g., tidal) conditions. During storm conditions (e.g., hurricane or the like) ballast tanks may be completely flooded and the system totally submerged in order to protect the apparatus from storm damage. Such commands (and other commands) may be taken by Control System A based on main shaft speed sensor as previously discussed, or sent to the system via satellite, radio, or cable communications link (not shown) to control the apparatus. Similarly, Control System A may also communicate status and operating information back to a central station using the same or similar link, for maintenance and monitoring purposes.

Control System A may engage or disengage generators 5a-5h to compensate for wave conditions and to optimize energy output for a given wave condition. Note that Control System A may also monitor the conditions of generators 5a-5h and shut down generators which may require service or are otherwise malfunctioning. Note that Control System A may be programmed to randomly assign (or assign according to a schedule) the operation of different generators 5a-5h such that all generators wear evenly (e.g., each accumulates a similar number of operating hours).

Control System A may also actuate fin positioning system 3130 to orient the system relative to incoming waves to optimize energy output and to compensate for wave height and weather conditions. During heavy seas, Control System A may orient fins such that the apparatus minimizes energy absorbed.

Figure 32:
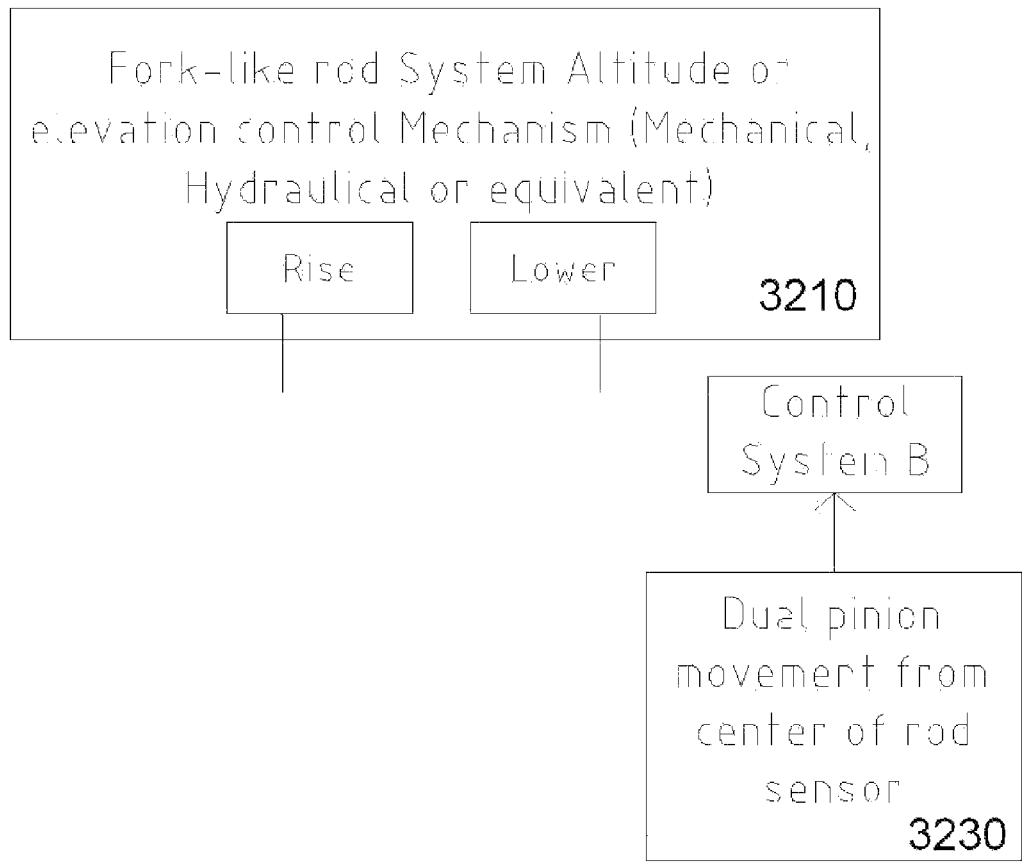
FIG. 32 is a block diagram of Control System B for controlling altitude or elevation of the fork-like rod system.

FIG. 32 is a block diagram for Control System B illustrating the scheme for controlling altitude or elevation of the fork-like rod system. In FIG. 32, sensor inputs 3230 may include dual pinion movement from the center of the rod, to indicate where in the rod the pinions are travelling. Other sensor data may also be input to Control System B. Control System B then outputs a signal to fork-like rod system altitude elevation control mechanism, which may raise or lower the rods accordingly to insure the pinions are running at or near the center portion of the rods and are not overrunning the end stops. As previously noted, Control System B and Control System A may be combined into one control system, or may be different subroutines or portions of the same control system, or may comprise a number of subsystems themselves.

Figure 33:
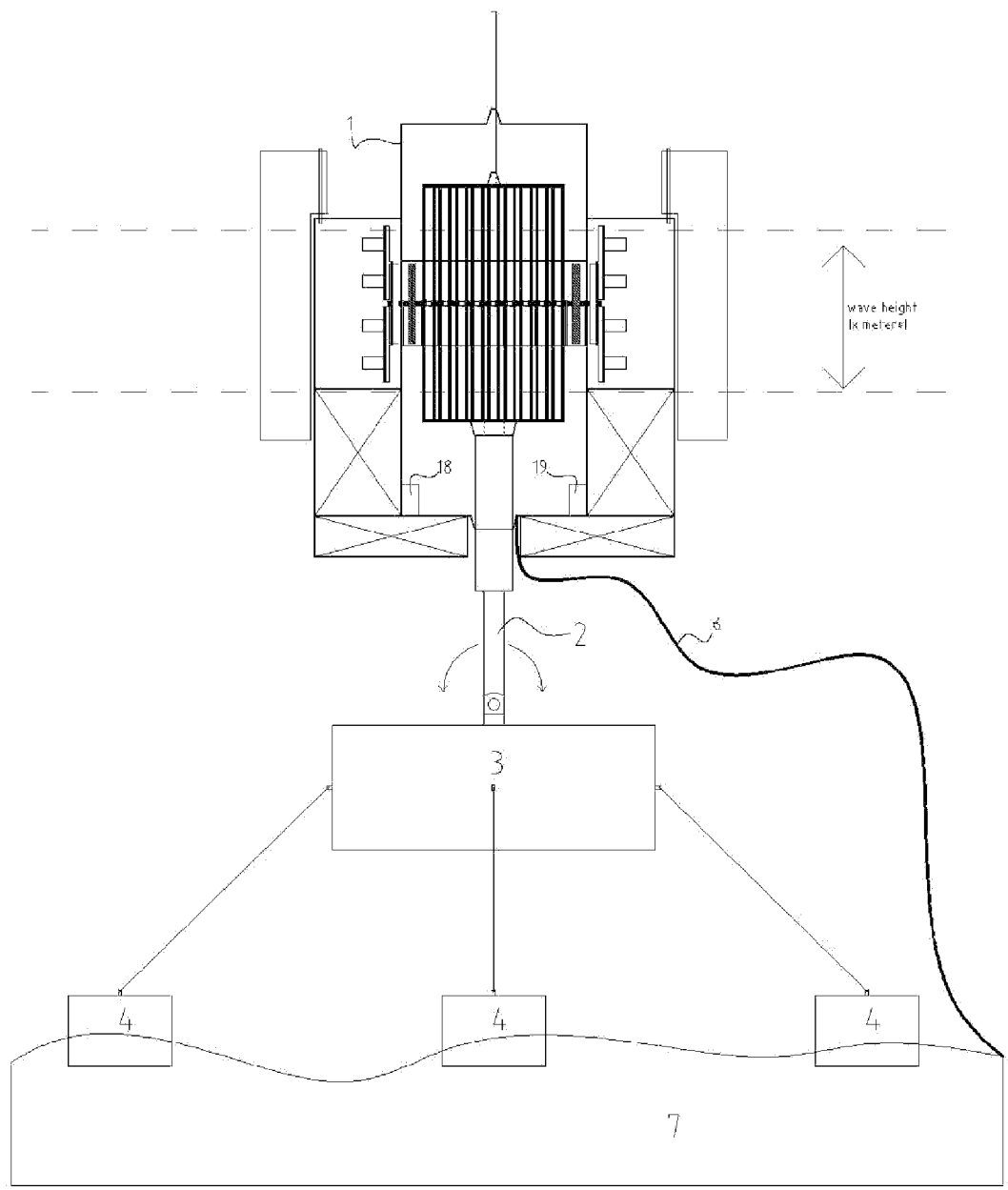
FIG. 33 is a front view of the wave energy converter with positive pressure maintaining mechanism and bilge pump mechanism.

FIG. 33 shows a front view of the wave energy converter with positive pressure maintaining mechanism 18 and bilge pump mechanism 19. Also shown there are fork-like rod system actuating member 2, underwater floating base 3 weights 4, cable 6 to carry power generated by the device to shore, and seabed 7. Notice wave direction and position with respect to the floating hull 1. Maintaining positive pressure within the hull will tend to force water out of the hull. Bilge pump 19 may remove what water does enter.

Figure 34:
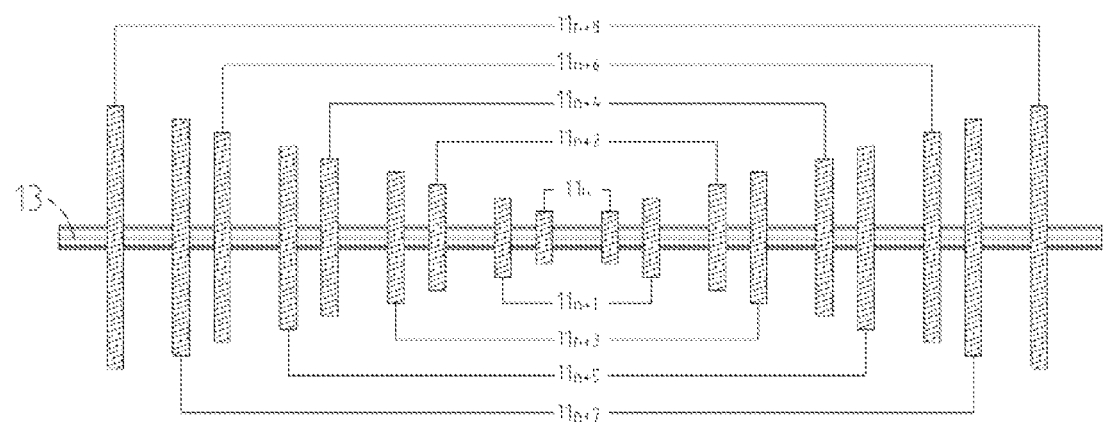
FIG. 34 illustrates one of the different arrangements of sets of different diameter same-diameter dual pinions on the main rotary shaft.
Figure 35:
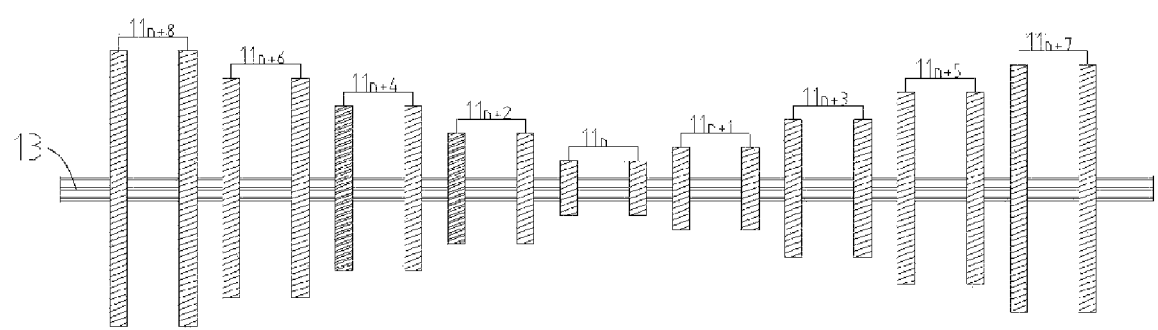
FIG. 35 illustrates another of the different arrangements of sets of different diameter same-diameter dual pinions on the main rotary shaft.
Figure 36:
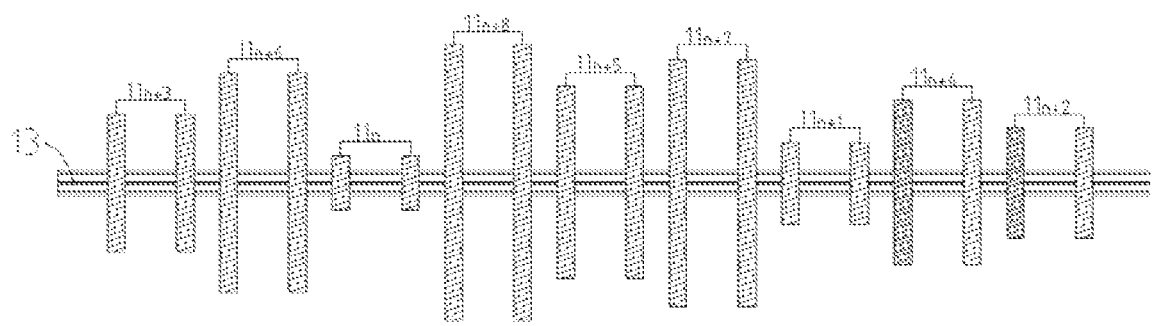
FIG. 36 illustrates yet another of the different arrangements of sets of different diameter same-diameter dual pinions on the main rotary shaft.

FIGS. 34 to 36 exhibit some of the different arrangements of, for this example, nine sets of different diameter same-diameter dual pinions 11n to 11n+8 on the main rotary shaft. There may be other permutations of the positions of the dual same-diameter pinions on the main rotary shaft. There may be any number of the dual same-diameter pinions on the main rotary shaft, depending of size and design characteristics of the WEC and its location.

While the preferred embodiment and various alternative embodiments of the invention have been disclosed and described in detail herein, it may be apparent to those skilled in the art that various changes in form and detail may be made therein without departing from the spirit and scope thereof.

We claim:

1. An apparatus for generating energy from water wave action, comprising:

a hull floating in the water and oscillating up and down in response to wave action a plurality of rods having gear teeth therein, fixed relative to the hull, such that when the hill oscillates up and down, the plurality of rods remain relatively stationary relative to the hull, a plurality of at least pinion gear pairs, each pinion of the plurality of pinion gear pairs engaging a corresponding one of the plurality of rods, such that when the hull oscillates up and down, the pinions rotate, a main shaft, for outputting rotary shaft motion, a plurality of freewheel mechanisms, each coupled to a corresponding one of the plurality of at least pinion gear pairs, and rotating on the main shaft, such that when a selected pinion rotates in a predetermined direction, rotational energy from the pinion is coupled to the main shaft for transmitting wave energy from oscillation of the hull into rotational shaft energy.

2. The apparatus of claim 1, wherein the freewheel mechanisms for a pair of pinion gears are geared to operate in opposite directions, such that one pinion of a pair of pinion gears will transmit rotational energy to the main shaft when the hull oscillates up in response to a wave, and the other pinion of a pair of pinion gears will transmit rotational energy to the main shaft when the hull oscillates down in response to a wave.

3. The apparatus of claim 2, wherein the plurality of at least pinion gear pairs comprise a plurality of pinion gear pairs in a range of diameters, each pair having the same diameter, such that each pair of pinion gears rotates the main shaft a different amount relative to oscillation of the plurality of rods.

4. The apparatus of claim 3, further comprising:
a plurality of engagement means, for each pair of pinion gear pairs, for engaging one of the pair of pinion gear pairs.

5. The apparatus of claim 4, further comprising:
a first control system, for detecting rotational speed of the main shaft and engaging a select one of the plurality of engagement means in response to a detected rotational speed.

6. The apparatus of claim 5, further comprising:
at least one generator, coupled to the main shaft, through flywheels for generating electrical current.

7. The apparatus of claim 6, wherein the at least one generator comprises a plurality of generators, selectively engagable to the main shaft through flywheels.

8. The apparatus of claim 7, wherein the first control system engages and disengages one or more of the plurality of generators in response to changes in rotational speed of the main shaft.

9. The apparatus of claim 8, further comprising a second control system for measuring the average distance that the pairs of pinions run on the rods, and if the average distance run by the pinion up from the center of the rod is larger than the average distance run by the pinion down from the center of the rod, the second control system may raise the rods a given distance from its fixed point to maintain the difference between the average distance run by the pinion up from the center of the rod.

10. The apparatus of claim 1, further comprising:
one or more directional control means, for orienting the hull for maximum energy absorption per wave crest.

11. The apparatus of claim 10, wherein the one or more directional means comprise at least one fin for directing a longitudinal axis of the hull parallel to the wave crest.

12. The apparatus of claim 11, further comprising a control means, coupled to the at least one fin, for controlling orientation of the hull for optimum energy absorption per wave crest in response to sensed wave conditions.

13. The apparatus of claim 1, further comprising:
one or more directional control means, for orienting the hull for minimum energy absorption per wave crest.

14. The apparatus of claim 13, wherein the one or more directional means comprise at least one fin for directing a longitudinal axis of the hull perpendicular to the wave crest.

15. The apparatus of claim 14, further comprising a control means, coupled to the at least one fin, for controlling orientation of the hull for minimal energy absorption per wave crest in response to sensed wave conditions.

16. An method for generating energy from water wave action in an apparatus comprising a hull floating in the water and oscillating up and down in response to wave action, a plurality of rods having gear teeth therein, fixed relative to the hull, such that when the hill oscillates up and down, the plurality of rods remain relatively stationary relative to the hull, a plurality of at least pinion gear pairs, each pinion of the plurality of pinion gear pairs engaging a corresponding one of the plurality of rods, such that when the hull oscillates up and down, the pinions rotate, and a main shaft, for outputting rotary shaft motion, the method comprising the step of:
selectively engaging a plurality of freewheel mechanisms, each coupled to a corresponding one of the plurality of at least pinion gear pairs, and rotating on the main shaft, such that when a selected pinion rotates in a predetermined direction, rotational energy from the pinion is coupled to the main shaft for transmitting wave energy from oscillation of the hull into rotational shaft energy.

17. The method of claim 16, wherein the freewheel mechanisms for a pair of pinion gears are geared to operate in opposite directions, such that one pinion of a pair of pinion gears will transmit rotational energy to the main shaft when the hull oscillates up in response to a wave, and the other pinion of a pair of pinion gears will transmit rotational energy to the main shaft when the hull oscillates down in response to a wave.

18. The method of claim 17, wherein the plurality of at least pinion gear pairs comprise a plurality of pinion gear pairs in a range of diameters, each pair having the same diameter, such that each pair of pinion gears rotates the main shaft a different amount relative to oscillation of the plurality of rods.

19. The method of claim 18, wherein the step of engaging a plurality of freewheeling mechanisms further comprises engaging one or more of a plurality of engagement means, for each pair of pinion gear pairs, for engaging one of the pair of pinion gear pairs.

20. The method of claim 19, wherein the step of engaging a plurality of freewheeling mechanisms further comprises detecting rotational speed of the main shaft using a first control system and engaging a select one of the plurality of engagement means in response to a detected rotational speed.

21. The method of claim 20, wherein the apparatus includes at least one generator, coupled to the main shaft, through flywheels for generating electrical current.

22. The method of claim 21, wherein the at least one generator comprises a plurality of generators, selectively engagable to the main shaft through flywheels.

23. The method of claim 22, further comprising the step of the first control system engaging and disengaging one or more of the plurality of generators in response to changes in rotational speed of the main shaft.

24. The method of claim 23, further comprising the step of measuring the average distance that the pairs of pinions run on the rods using a second control system, and if the average distance run by the pinion up from the center of the rod is larger than the average distance run by the pinion down from the center of the rod, the second control system may raise the rods a given distance from its fixed point to maintain the difference between the average distance run by the pinion up from the center of the rod.

25. The method of claim 16, further comprising the step of orienting the hull for maximum energy absorption per wave crest using one or more directional control means.

26. The method of claim 25, wherein the one or more directional means comprise at least one fin for directing a longitudinal axis of the hull parallel to the wave crest.

27. The method of claim 26, further comprising the step of controlling orientation of the hull for optimum energy absorption per wave crest in response to sensed wave conditions using of a control means, coupled to the at least one fin.

28. The method of claim 16, further comprising the step of for orienting the hull for minimum energy absorption per wave crest using one or more directional control means.

29. The method of claim 28, wherein the one or more directional means comprise at least one fin for directing a longitudinal axis of the hull perpendicular to the wave crest.

30. The method of claim 29, further comprising the step of controlling orientation of the hull for minimal energy absorption per wave crest in response to sensed wave conditions using a control means, coupled to the at least one fin.

* * * * *